(12) United States Patent
Misawa

(10) Patent No.: US 6,885,402 B1
(45) Date of Patent: Apr. 26, 2005

(54) SOLID-STATE IMAGE PICKUP APPARATUS WITH FAST PHOTOMETRY WITH PIXELS INCREASED, AND SIGNAL READING OUT METHOD THEREFOR

(75) Inventor: Takeshi Misawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/492,146

(22) Filed: Jan. 27, 2000

(30) Foreign Application Priority Data

Jan. 28, 1999 (JP) ............................................ 11-020068

(51) Int. Cl.[7] .......................... H04N 3/14; H04N 5/335; H04N 5/225; H04N 9/083; G06K 9/32
(52) U.S. Cl. .................... 348/315; 348/220.1; 348/275; 382/299
(58) Field of Search ........................... 348/220.1, 221.1, 348/230.1, 315, 319, 322, 333.05, 333.12, 275, 280; 382/299

(56) References Cited

U.S. PATENT DOCUMENTS

| | | | | |
|---|---|---|---|---|
| 4,242,700 A | * | 12/1980 | Weimer ...................... | 348/275 |
| 6,075,565 A | * | 6/2000 | Tanaka et al. ............... | 348/312 |
| 6,130,420 A | * | 10/2000 | Tanaka et al. ........... | 250/208.1 |
| 6,236,434 B1 | * | 5/2001 | Yamada ...................... | 348/315 |
| 6,423,959 B1 | * | 7/2002 | Ikeda et al. ............... | 250/208.1 |
| 6,426,493 B1 | * | 7/2002 | Oda ........................ | 250/208.1 |
| 6,496,224 B1 | * | 12/2002 | Ueno ......................... | 348/322 |
| 6,529,236 B1 | * | 3/2003 | Watanabe ................. | 348/230.1 |
| 6,583,818 B1 | * | 6/2003 | Toma ......................... | 348/312 |
| 6,628,328 B1 | * | 9/2003 | Yokouchi et al. ........... | 348/312 |
| 2001/0043276 A1 | * | 11/2001 | Ueno ......................... | 348/322 |
| 2002/0171033 A1 | * | 11/2002 | Okada ..................... | 250/208.1 |
| 2004/0017497 A1 | * | 1/2004 | Suzuki et al. ............... | 348/315 |

FOREIGN PATENT DOCUMENTS

| JP | B2431231 | 12/1985 |
|---|---|---|
| JP | A677450 | 3/1994 |
| JP | A 10-136391 | 5/1998 |

* cited by examiner

*Primary Examiner*—Wendy R. Garber
*Assistant Examiner*—John Villecco
(74) *Attorney, Agent, or Firm*—Birch, Stewart, Kolasch & Birch, LLP.

(57) ABSTRACT

A solid-state image pickup apparatus capable of performing, for instance, AE control by means of an image signal containing all colors used for color separation in photosensitive cells arranged in a honeycomb-like structure, and signal reading out method therefor. A digital still camera supplies a signal in a mode set by a mode setting section to a system control section. Upon receiving the signal, the system control section controls a drive signal generation section to generate a drive signal. Incident lights are supplied onto an image pickup section through color separation filters having filter segments of identical colors arranged in a column direction. The image pickup section photoelectrically converts the lights incident to the respective photosensitive cells. A drive signal generated by the drive signal generation section according to the specified mode is supplied to a signal reading out gate, so that a transfer for the signal charges is performed. In this case, signals for all the colors are read out in response to the drive signal in compliance with the color filter arrangement of the color separation filters. The signals read out are used by AF and AE adjustment sections for appropriate controls.

11 Claims, 19 Drawing Sheets

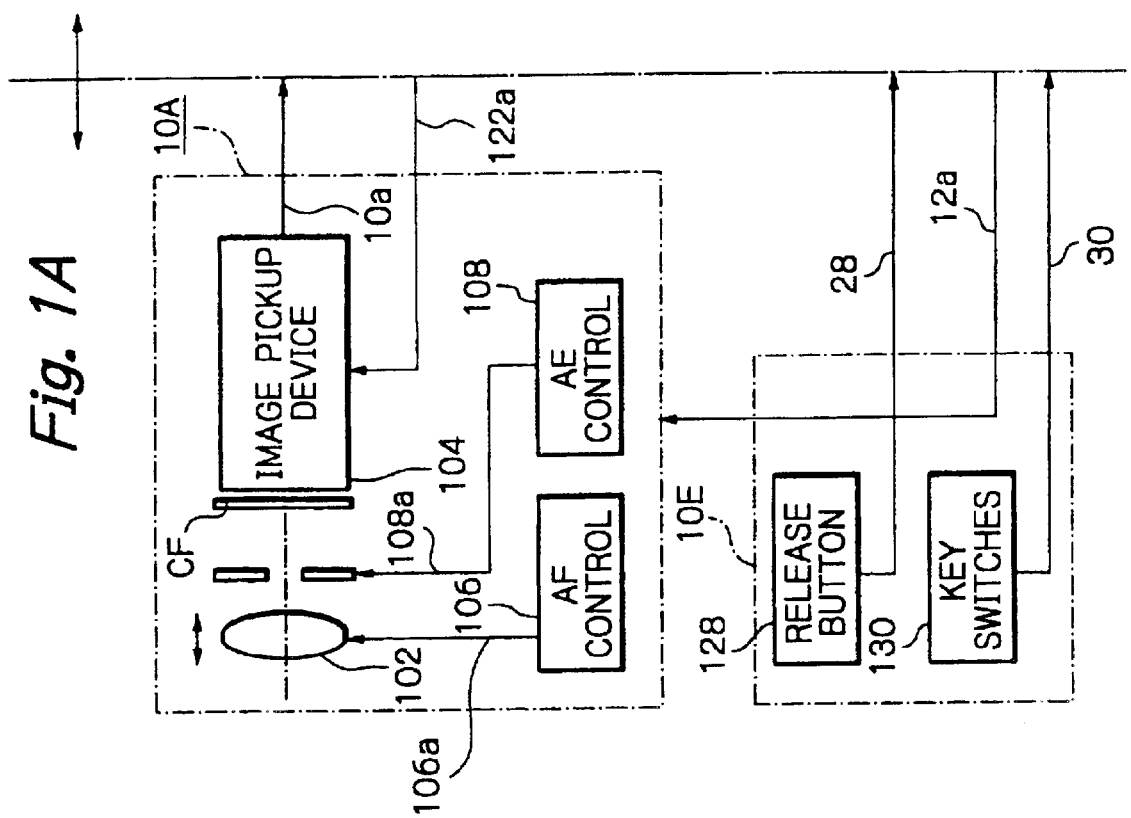

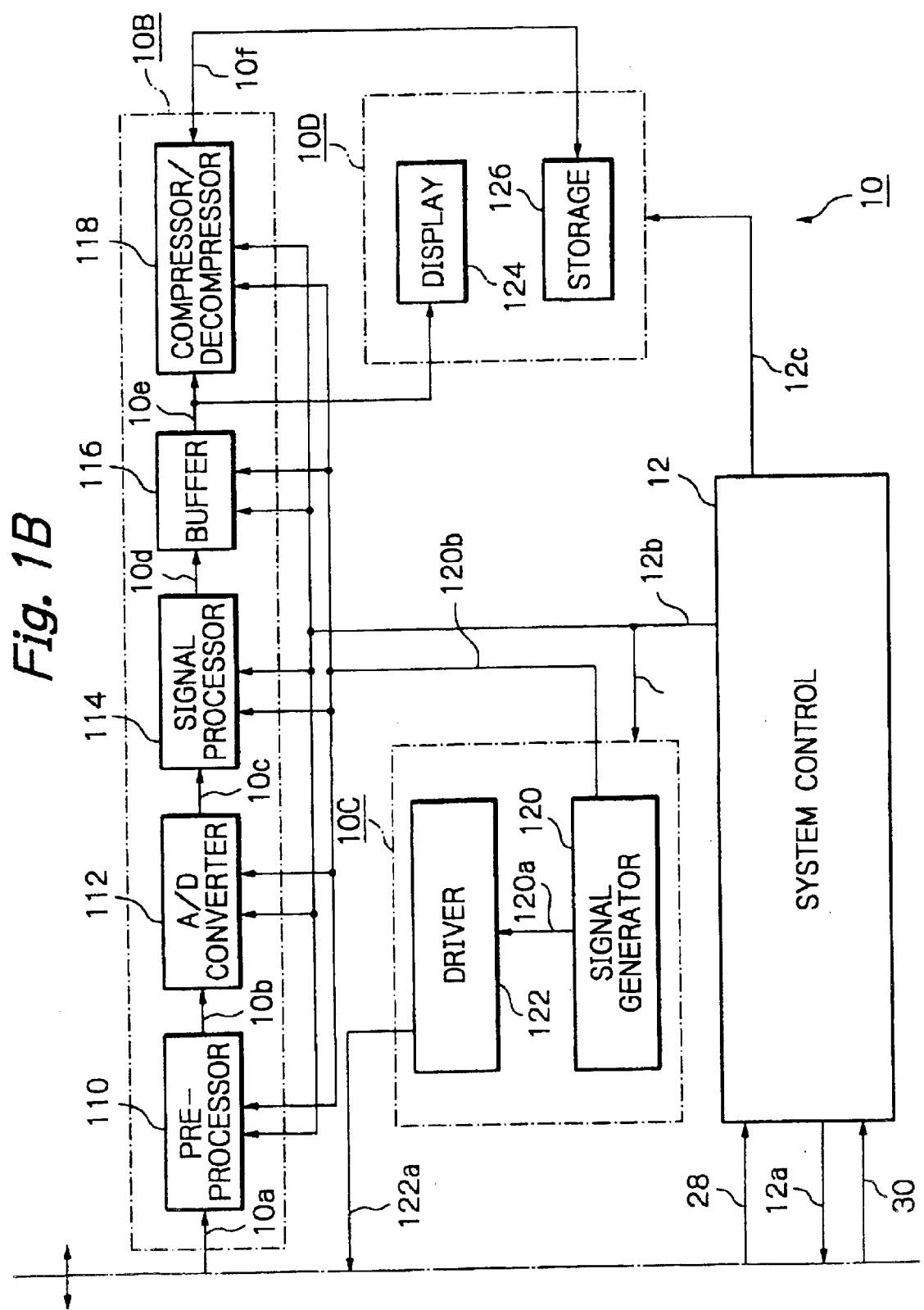

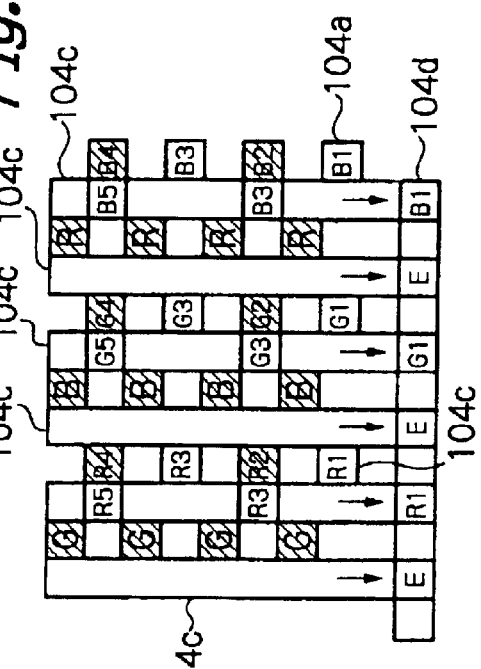
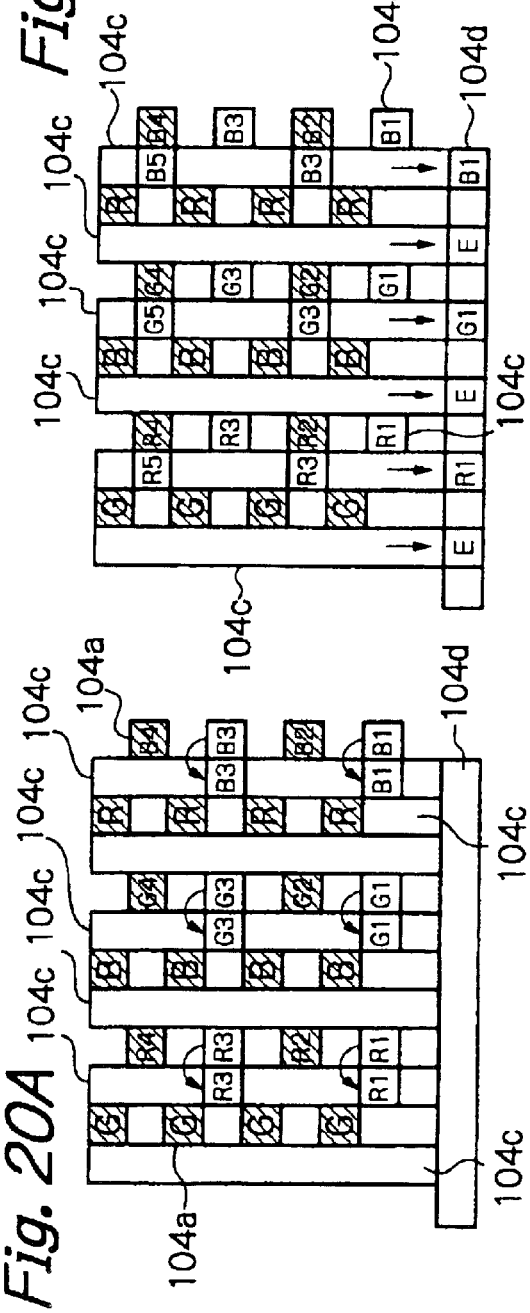
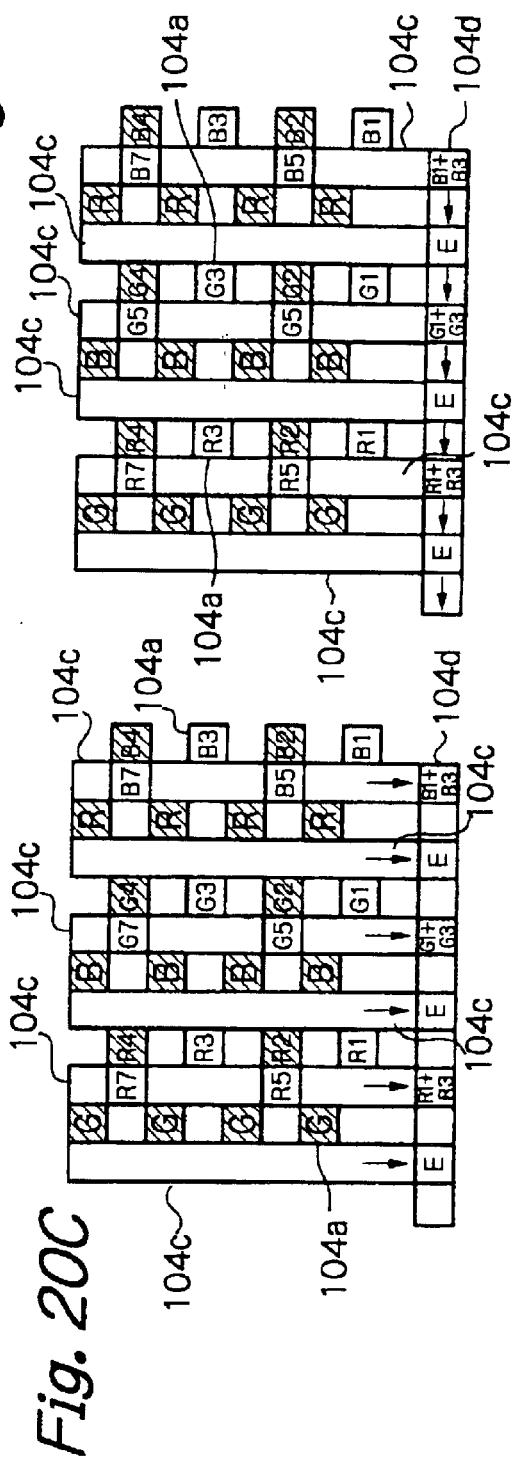
Fig. 20A   Fig. 20B   Fig. 20C   Fig. 20D

SOLID-STATE IMAGE PICKUP APPARATUS WITH FAST PHOTOMETRY WITH PIXELS INCREASED, AND SIGNAL READING OUT METHOD THEREFOR

BACKGROUND OF THE INVENTION

1. Field of the Invention

The present invention relates to a solid-state image pickup apparatus with fast photometry with pixels increased and a signal reading out method therefor. More particularly, the invention relates to a solid-state image pickup apparatus, which includes an array of photosensitive cells integrated in higher density and arranged obliquely adjacent to each other, that is, in the co-called honeycomb structure having the lines or rows of cells offset from each other by a length equal to the half of the pitch of the cells in line or row, to accomplish an increased resolution, and which is advantageously applicable to an electronic still camera, an image input apparatus and the like.

2. Description of the Background Art

With reference to a solid-state image pickup apparatus taking the so-called honeycomb arrangement, various proposals have been disclosed in, for example, Japanese patent publication No. 31231/1992, and Japanese patent laid-open Nos. 77450/1994 and 136391/1998.

In the apparatus disclosed in Japanese patent publication No.31231/1992, first electrodes meander along photosensitive cells which are arranged in the offset manner, so as to form a wavy shape pattern, and second electrodes are formed in another wavy pattern opposite in phase to the former. Other photosensitive cells are arranged in a region where the first and second electrodes separate so as to enable a signal to be read out from each cells via means for selectively coupling with the second electrodes, in response to an enable signal supplied to the first electrode, thus further increasing the resolution and the sensitivity of the solid-state image pickup apparatus from conventional. In the publication, the photosensitive cells are exemplified as formed octagonal.

In Japanese patent laid-open publication No. 77450/1994, the shape of photosensitive cells is formed as a square which is one of diamond shapes, and each side thereof forms an angle of 45 degrees in a vertical direction, so that its aperture ratio is made to be high, thus miniaturizing the solid-state image pickup apparatus. Particularly, by adopting a honeycomb arrangement, an increase in a vertical resolution is achieved. Moreover, a micro-lens is disposed on each photosensitive cell, thus increasing a light receiving efficiency.

In Japanese patent laid-open publication No. 136391/1998, meandering charge transfer devices of two lines are arranged between photoelectric conversion devices in a column direction, which are disposed so as to be adjacent to each other in the same row and relatively shifted by approximately the half of the interval between themselves in the adjacent rows, and the charge transfer devices are used for transferring the charge from the photoelectric conversion devices obliquely adjacent to each other. A spurious signal aliasing such as moiré is suppressed while achieving a high-density integration of the photoelectric conversion devices and an increase in a photoelectric conversion efficiency.

In this case, color filter segments are arranged in the form of Bayer arrangement rotated by 45°. In this color filter arrangement, color G is arranged in an isotropic relation to color R/B in both row and column directions. Also, a honeycomb stripe pattern is used, where the same number of color filter segments for colors R, G and B are uniformly arranged. In this case, the shape of the color filter segments are a regular hexagon and set in a relationship where the center distances between adjacent photosensitive cells are all equal.

In the foregoing Japanese patent publication No. 31231/1992 and Japanese patent laid-open publication No. 77450/1994, attention is paid only to the structure of the device in aiming at a high-density integration. Moreover, in Japanese patent laid-open publication No. 136391/1998, descriptions for the structure and the shape of the device and the positional relation of the color filters are made. Then, descriptions of whole-pixel reading out using these relations are made.

By the way, it is apprehended that a high-density integration takes times for a reading out of signal charge obtained by a photoelectric conversion. For example, in a mode of controlling a light measurement or a photometry in which an automatic focus adjustment (AF) and an automatic exposure (AE) control are performed, there are demands for shortening a time required for reading out the signal charge and for finishing a preparation for an image pickup without delay. For photosensitive cells, the high-density integration of the image pickup devices and shortening of the time of the signal reading out are antinomic demand, which are contradictory to each other.

Particularly, when the signal is read out from the photosensitive cells adopting a honeycomb arrangement in the mode of controlling a light measurement, a breakthrough by a different method from conventional methods is needed.

In particular, to perform Automatic Exposure (AE) control or Automatic White Balance (AWB) adjustment, information on all colors is necessary, and single-color reading out as in the case of Automatic Focus adjustment (AF) is useless. High-speed signal reading out timed with a drive signal is desired when the image capturing with the AE and AWB controls is performed.

SUMMARY OF THE INVENTION

It is therefore an object of the present invention to provide a solid-state image pickup apparatus capable of performing, for instance, AE control faster than conventional signal reading out by means of an image signal containing all colors used for color separation in photosensitive cells arranged in a honeycomb-like structure, and to provide a signal reading out method therefor.

In a solid-state image pickup apparatus capable of performing, for instance, AE control by means of an image signal containing all colors used for color separation in photosensitive cells arranged in a honeycomb-like structure, and signal reading out method therefor, a digital still camera supplies a signal in a mode set by a mode setting section to a system control section. Upon receiving the signal, the system control section controls a drive signal generation section to generate a drive signal. Incident lights are supplied onto an image pickup section through a color separation filter having filter segments of identical colors arranged in a column direction. The image pickup section photoelectrically converts the lights incident to the respective photosensitive cells. A drive signal generated by the drive signal generation section according to the specified mode is supplied to a signal reading out gate, so that an transfer for the signal charges is performed. In this case, signals for all the colors are read out in response to the drive signal in compliance with the color filter arrangement of the color separation filters. The signals read out are used by AF and AE adjustment sections for appropriate controls.

Accordingly, in an application in which much more photosensitive cells are integrated, time required for signal reading out can be shortened without any color limitations. Thus, the solid-state image pickup apparatus is advantageously applicable to, for instance, AE or AWB adjustment control which requires a reduction in signal reading out time.

A signal reading out method of the present invention includes the steps of selecting a whole-pixel reading out mode of reading out signal charges from all the pixels or a thinning reading out mode for reading out signal charges after thinning, generating a drive signal for reading out the signal charges according to the selected mode, selecting a destination to which this drive signal is supplied, and then supplying the signal to the destination. An incident light is separated into at least three colors, and the incident light separated in the color in the color separation step is received by each of a plurality of photosensitive cells.

After this image pickup step, especially in the thinning reading out mode, only signal charges generated by the photosensitive cells of a line to be read out among the plurality of photosensitive cells are field-shifted in response to the drive signal. Thereafter, signal charges are transferred in a column direction in compliance with the arrangement of color filters for color separation. Then, after the signal charges are shifted in line, the signal charges "EMPTY" of column where neither pixel mixing nor signal reading out occurs are synthesized to combine signals read out from a plurality of the photosensitive cells. By transferring the line-shifted signal charges in a horizontal direction, compared with signal reading out in the whole-pixel reading out mode, reading out of the signal charges of all the colors can be completed within a very short time.

BRIEF DESCRIPTION OF THE DRAWINGS

The objects and features of the present invention will become more apparent from consideration of the following detailed description taken in conjunction with the accompanying drawings in which:

FIG. 1 shows a way of connecting FIGS. 1A and 1B with each other;

FIGS. 1A and 1B are schematic block diagrams, which show in contribution an exemplified constitution of a solid-state image pickup apparatus of the present invention applied to a digital still camera;

FIGS. 20A to 20D are schematic views useful for understanding the transferring process of the ¼ thinning in a vertical direction shown in FIG. 15 and the improved type of thinning (¼) including pixel mixing carried out twice.

DESCRIPTION OF THE PREFERRED EMBODIMENTS

Figure 2:
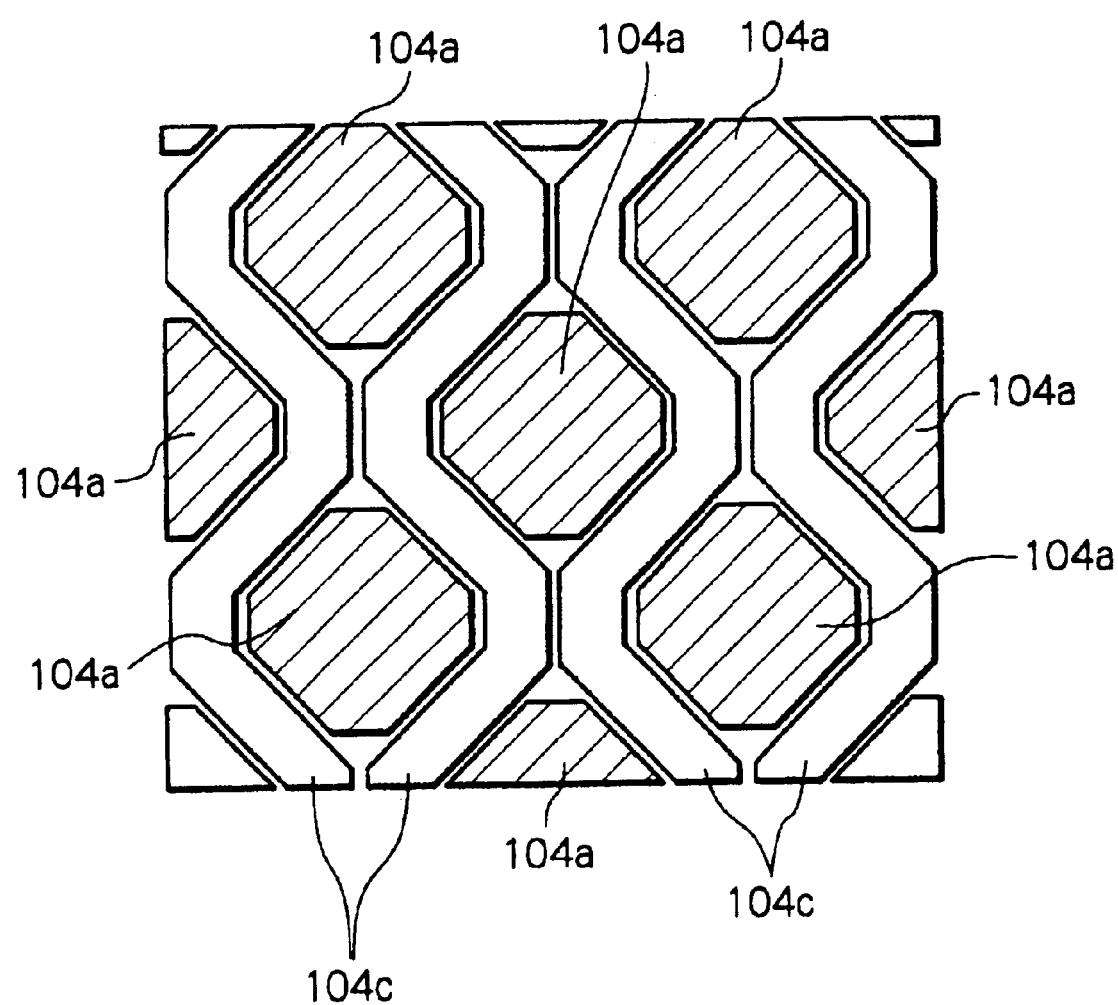
FIG. 2 is a schematic plan view useful understanding the relationship between the vertical transfer paths and photosensitive cells arranged in the form of a honeycomb in the image pickup device of FIG. 1A, when viewing from its light incident side.

Next, description will be made of a preferred embodiment of a solid-state image pickup apparatus in accordance with the present invention with reference to the accompanying drawings.

A solid-state image pickup apparatus of the present invention includes an image pickup device having an array of photosensitive cells integrated in the form of honeycomb arrangement, and requires a shorten period of time for reading out a signal than that for the whole-pixel scheme in order to achieve a high speed automatic control of AE and AWB by using all the colors of the primary or complementary color filters, for example. A noteworthy feature of the solid-state image pickup apparatus is its capability of performing the automatic control as fast as conventional by reading out signals from specified photosensitive cells even in the honeycomb arrangement employed.

Description will now be made of a case where the solid-state image pickup apparatus of the present invention is applied to a digital still camera 10. Parts having no direct relations with the present invention are not shown, and description thereof will be omitted. Signals are designated with the same reference numerals as connecting lines on which the signals are conveyed.

As shown in FIGS. 1A and 1B, the digital still camera 10 includes an image pickup system 10A, a signal processing system 10B, a drive signal generation section 10C, a signal output system 10D, a mode setting section 10E and a system control 12.

The image pickup system 10A includes an optical lens 102, an image pickup device 104, an AF control 106 having a focusing mechanism and an AE control 108 having an aperture mechanism. In addition to these elements, although not shown, to completely shut off an incident light, a shutter mechanism may be included in an incident light side of the image pickup device 104. The optical lens 102 is an optical system for focusing the incident light from an object field on a photosensitive array of the image pickup device 104.

The image pickup device 104 includes an array of photosensitive cells 104a arranged two-dimensionally in a honeycomb-like manner in row and column directions such that the photosensitive cells 104a for performing photoelectric conversion for supplied incident lights form a light receiving plane (see FIG. 2). In the honeycomb-like structure, the respective photosensitive cells 104a are shifted or offset from other photosensitive cells obliquely adjacent thereto by a length equal to the half of the pitch thereof in the row and column directions. The honeycomb-like structure does not mean the shape of the photosensitive cell. It should be noted that the pitch means, for example, the distance between the centers of the adjacent two photosensitive cells in the row or column direction. In the image pickup device 104, on the surface of the photosensitive cells 104a, a single plate of color separation filter CF is formed integrally to separate colors of the incident light, which correspond to the respective photosensitive cells 104a. The arrangement of the color separation filter CF causes an incident light to be separated in color to have the respective color attributes of primary colors RGB to be received by the respective photosensitive cells 104a.

Figure 3:
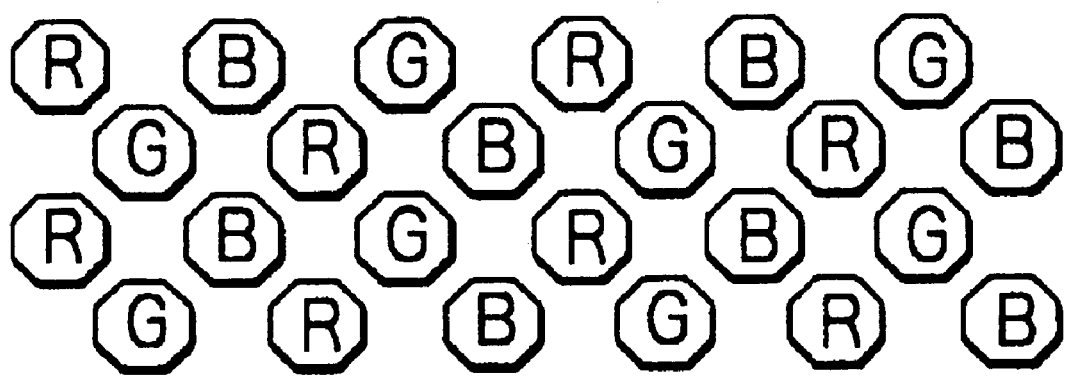
FIG. 3 is a schematic plan view showing an arrangement of color separating filters adopting a honeycomb type G square lattice RB complete checkered pattern, in which the color separation filters are arranged integrally with each other on the light incident side of the image pickup device shown in FIG. 1A.

As shown in FIG. 3, because of the integral structure, this relationship of colors is represented by symbols R, G and B indicating colors in the respective photosensitive cell 104a. The same color filer segment R G or B of FIG. 3 is aligned in the vertical direction as in the stripe form. Thus, this color filter arrangement is called a honeycomb type stripe pattern. The image pickup device 104 outputs an image signal 10a to the signal processing system 10B.

In the illustrative embodiment shown and described above, the single plate of color separation filter CF is of the honeycomb type primary color RGB columnar striped pattern composed of the RGB filer segments. The present invention is however not restricted to the specific type of color filter described above but advantageously applicable to other filter systems of complementary colors, such as the honeycomb type three-color GYeCy columnar striped pattern in which for the color filter segments R, G and B of the honeycomb type primary color RGB columnar striped pattern, replaced are the color filter segments of Yellow Ye, green G and cyan Cy, respectively, and the honeycomb type three-color, Gray or W and YeCy columnar striped pattern in which for the color filter segments Ye, G and Cy of the honeycomb type three-color GYeCy columnar striped pattern, replaced are the color filter segments of yellow Ye, gray Gray or white W, and cyan Cy, respectively.

Figure 4:
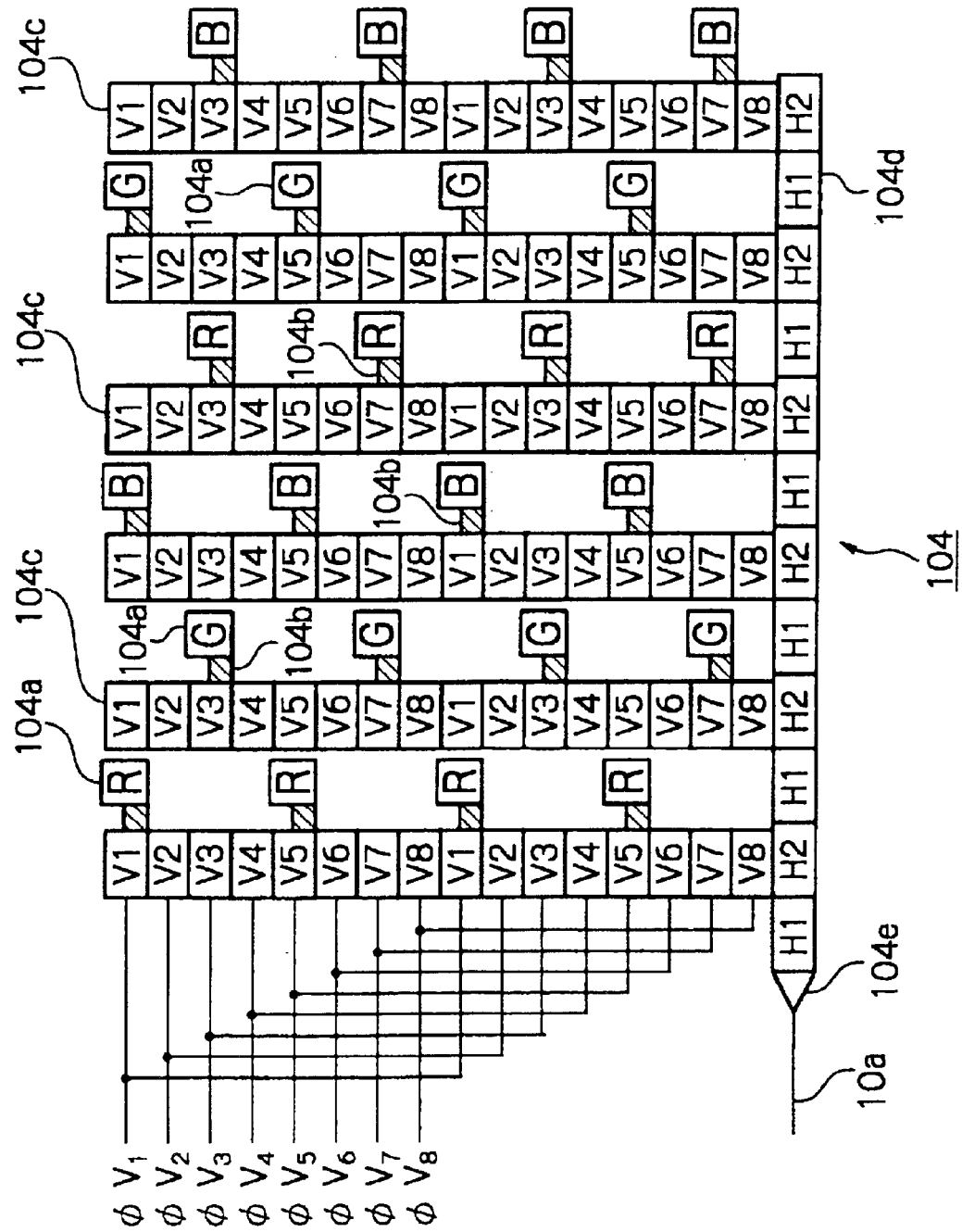
FIG. 4 is a schematic plan view showing the connections of the photosensitive cells, signal reading out gates, transfer devices on the vertical transfer paths and horizontal transfer paths, and drive signals supplied to them.

The constitution of the image pickup device 104 will be further described. The image pickup device 104 operates in response to a drive signal 122a output from the drive signal generation section 10C. Each of the photosensitive cells 104a is constituted by a charge coupled device (hereinafter referred to as CCD). As shown in FIG. 4, each of the photosensitive cells 104a is provided with a signal reading out gate or transfer gate 104b connected to a transfer device adjacent thereto, specifically the vertical transfer device. The signal reading out device 104b is adapted to block the signal charge converted from the incident light from leaking. The signal reading out gates 104b transfer the signal charge from the photosensitive cells 104a to vertical transfer paths 104c in response to a field shift pulse supplied through the electrodes. The vertical transfer paths 104c transfer sequentially the signal charge read out in the column direction, that is, in the vertical direction. The signal charge is supplied to transfer devices in line direction, that is, horizontal transfer path 104d, through line shifting. In response to a drive signal, the horizontal transfer path 104d outputs this signal charge to the signal processing system 10B through an amplifier 104e as described above.

Here, in each of the vertical transfer paths 104c, three transfer devices are disposed between adjacent two of the photosensitive cells 104a when viewing in the vertical direction (column direction). The four transfer devices, including the transfer devices connected to the associated signal reading out gates 104b, are used for transferring data of a pixel in one line. Thus, it is proved that four-phase drive signals are supplied as the drive signal for one line transfer. Each of the signal reading out gates 104b is disposed between one of the photosensitive cells 104a and one of the vertical transfer paths 104c.

Furthermore, since the arrangement of the photosensitive cells in the honeycomb-like manner is adopted in which the respective photosensitive cells are shifted from other photosensitive cells obliquely adjacent thereto by the half of pitch in the row and column directions, between adjacent two vertical transfer devices 104c in question, the signal reading out gates 104b are disposed in such a manner that one is shifted from the other in the vertical direction by a distance equal to the two transfer devices of the vertical transfer paths 104b.

Specifically, when the relation in the arrangement between the two vertical transfer paths 104c is observed, the photosensitive device of color G corresponds in level to the vertical transfer device V1 in the vertical direction, the photosensitive device of color R to the vertical transfer device V3, the photosensitive device of color G to the vertical transfer device V5, and so on. The basic constitution of the image pickup device 104 has been described above. With such constitution, the whole-pixel reading out is performed normally. Thus, the signal charge of all of the photosensitive cells is read out at a time.

Returning to FIG. 1A, the AF control 106 adjusts the focal position of the optical lens 102 so as to be brought at the optimum position in accordance with information obtained by measuring the distance between an object and the camera 10 by the focus adjustment mechanism (not specifically shown). At this time, an estimation of the information concerning the distance measurement and a control amount from the information concerning the distance measurement are processed by the system control 12. As a result, in response to the control signal 12a supplied, the AF control 106 drives the focus adjustment mechanism in response to the drive signal 106a, so as to move the optical lens 102 along its optical axis in the direction of the arrow A.

Furthermore, the AE control 108 permits the aperture or iris of the aperture mechanism to be displaced under the control of an exposure control (not shown) provided in the system control 12 adapted to estimate the amount or intensity of the measured light from the object field including the object, thus adjusting the amount of luminous flux incident onto the photosensitive array. The measurement of light is performed using a part of the image pickup signal. Also in this case, the exposure amount is calculated by the system control 12, based on the amount of measured light. The system control 12 supplies to the AE control 108 the control signal 12a for use in controlling the aperture value and the shutter speed value so as to mate with the calculated exposure amount. The AE control 108 supplies a drive signal 108a to the aperture mechanism and the shutter mechanism in response to the control signal 12a so as to adjust those mechanisms to the aperture value and the shutter speed value. This adjustment will optimize the exposure.

The signal processing system 10B of FIG. 1B comprises a pre-processor 110, an A/D converter 112, a signal processor 114, a buffer 116 and a compressor/decompressor 118. The pre-processor 110 performs, for example, a correlated double sampling (CDS) for signal charge 10a supplied thereto to reduce noises, and performs a gamma correction for the signal 10a. The pre-processor 110 amplifies the signal 10a. Thus, the amplified signal 10a is output to the A/D converter 112.

The A/D converter 112 samples the analog signal 10b supplied from the image pickup device 104 through the pre-processor 110, in response to a clock signal 120b supplied from the signal generator 120, which generates also a timing signal 120a, and using the control signal 12b from the system control 12, and quantizes the analog signal 10b, thus converting the signal 10b to a digital signal 10c. The resultant digital signal 10c is supplied to the signal processor 114.

The signal processor 114 performs the automatic exposure control, the white balance control (AWB: Automatic White Balance control) and the aperture correction for the signal 10c supplied, and then performs a signal processing in accordance with the two modes. Specifically, these two modes are directed to the modes set by a shutter release button 128 of a mode setting section 10E, described later, namely, a still picture shoot mode in which an obtained still image data is transferred to a storage 126 of a signal output system 10D, and simply a light control mode in the automatic focusing (AF) of the image pickup system 10A. A gamma correction may be performed in this stage or in a later stage.

In the digital still camera 10, which mode is to be selected is controlled by the control signal 12b from the system control 12. In the still picture shoot mode, under the control of the system control 12, the signal processor 114 performs a digital signal processing, such as the broadening of the band of the luminance signal on the signal which has been undergone the foregoing signal processing.

On the other hand, in the mode of controlling a light measurement, taking into account that the supplied signal 10c is digital, the system control 12 is adapted to perform a control such that the signal from the image pickup device 104 is read out faster than the conventional reading-out rate, and process the signal read out. In addition, the vertical thinning down of the lines is performed so as to allow the display 124 of the signal output system 10D to display the image representative of the image signal. The signal processor 114 performs a signal processing in the still picture shoot mode so as to convert the digital image signal 10c to a recordable video signal. Then, the signal processor 114 outputs to the buffer 116 the signal 10d in the mode in which a display/record is selected.

The buffer 116 has a function to amplify the video signal 10d supplied from the aforementioned signal processor 114 with a predetermined gain as well as to perform a control on its time axis in recording. Under the control of a recording control (not shown) arranged in the system control 12, the buffer 116 outputs the picture signal 10e either to the signal output system 10D or to the compressor/decompressor 118 or both.

In recording the picture, the compressor/decompressor 118 takes a picture signal 10e thereinto in response to the control signal 12b of the system control 12. The supplied picture signal 10e undergoes a compression based on, the Joint Photographic coding Experts Group (JPEG) standard, for example. When the signal 10f recorded is read out from the storage 126, the signal 10f is subjected to a signal processing such as a conversion reverse to the foregoing compression processing, whereby the original picture signal is reproduced. The restored picture signal (not shown) is supplied to the display 124 and displayed thereon.

The drive signal generation section 10C includes the signal generator 120 and a driver 122. The signal generator 120 generates synchronous signals 120b based on clock signals locally oscillated so as to drive the digital still camera 10 in, for example, a present broadcast system (NTSC/PAL) and supplies the signal 120b to the signal processor 114. The signal generator 120 supplies the signal 120b as clock signals for use in generating a sampling signal and a read/write signal to the pre-processor 110, the A/D converter 112, the buffer 116 and the compressor/decompressor 118.

The signal generator 120 generates the synchronous signals from the locally oscillated clock signals, and, using these signals, generates a variety of timing signals 120a. The generated timing signals 120a include timing signals used for reading out the signal charge excited in the image pickup device 104, such as, vertical timing signals which define timings for driving the vertical transfer paths, horizontal timing signals which define timings for driving the horizontal transfer paths and timing signals which are used to perform field shift and line shift. Moreover, the signals from the signal generator 120 are also used for controlling operations of the AF control 106 and the AE control 108. The lines conveying those signals are not illustrated apparently.

Thus, the various kinds of signals are output to the foregoing circuit components, and the signal generator 120 supplies the vertical timing signals and the horizontal timing signals to the driver 122. When the control signal 12b in the mode of controlling a light measurement (photometry mode) is supplied from the system control 12 to the signal generator 120, the signal generator 120 supplies a signal for elevating the substrate voltage of the photosensitive cells, that is, an overflow drain voltage for the photosensitive cells of the colors R and B, according to demand, for example, in the mode of controlling a light measurement. The supply of this signal enables a signal reading out prohibited state to be set.

For example, in the photosensitive cell of colors R and B, a state is set which is similar to one where no signal charges are generated at all. In the photometry mode, the signal generation section 120 generates a transfer gate signal to read out signal charges from a photosensitive cell that has received a signal reading out permission. When the photometry mode is selected, the signal generation section 120 selectively switches the timing signals in response to the control signal 12b from the system control 12. The driver 122 generates a drive signal 122a at the supplied timings. Generally, to change a signal reading out speed, a vertical drive signal output from the driver 122 in a selected mode is supplied to the image pickup device 104, so that a drive for the entire photosensitive array, a drive for selected colors and a drive based on the thinning rate of pixels are performed.

The driver 122 outputs a corresponding drive signal 122a, especially when the mode is set to the photometry mode. To change a drive signal level appropriately for a mode, a level switch is provided to perform the switching. Generally, a voltage level is selected from 1V, 5V, 8V and 12V in the illustrative embodiment. The driver 122 generates a drive signal 122a timed with the timing signal 120a supplied from the signal generation section 120. The driver 122 generates a tri-state drive signal from the vertical timing signal and the transfer gate signal.

The signal output system 10D includes the display 124 and the storage 126. In the display 124, a liquid crystal display monitor of the VGA (Video Graphics Array) standard supplied with inputs of digital RGB signals is provided. The storage 126 is adapted to store the video signal 10f supplied to a magnetic recording medium, a semiconductor memory used for a memory card, an optical recording medium or a magneto-optical recording medium. Moreover, the storage 126 is also capable of reading out the video signal 10f thus stored so to be displayed on the display 124. With the type of storage 126 in which the recording medium is detachably mounted the recording medium may be detached so as to reproduce the video signal recorded on the recording medium by an external apparatus to display and/or print the picture.

The mode setting section 10E includes a release button 128 and key switches 130. In this embodiment, a two-stroke button mechanism is provided in the release button 128. Specifically, in the half-depressed state as the first stroke, the photometry mode is set to develop a signal representing the photometry mode set to the system control 12. In the fully-depressed state as the second stage, the signal defining the timing for taking the picture is supplied to the system control 12 to notify the system control 12 of fact that the picture recording mode, or the still picture shoot mode, was selected. The settings of these modes are reported to the system control 12 on a signal line 28. Furthermore, when the shutter release button 128 is in its state of powering the camera 10 on and a switch (not shown) of the image monitoring display is in its ON state, the system control 12 based on the signal supplied through the release button 128 controls the display 124 so as to display a moving picture in the moving picture mode.

The key switches 130 is a cross-shaped key, which selects items and picture images by moving a cursor in all directions (e.g. up-/down-ward/right-/left-ward), which is displayed on the screen of the display 124. The selected information is also sent to the system control 12 on a signal line 30. Especially, the key switch 130 selects a thinning rate of pixels set to ½, ¼ or ⅛ in the photometry mode, and supplies the selected thinning rate to the system control 12. This setting prescribes for the way of reading out signal charges used for AE and AWB in the photometry mode.

The system control 12 is adapted for controlling the general operation of the camera. The system control 12 includes a central processing unit (CPU). The system control 12 decides, based upon the input signal 28 from the release button 128, which mode is selected. Furthermore, the system control 12 controls the processing on the picture signal of the camera by selection information 30 from the key switches 130 as described above. Based on the supplied information, the system control 12 controls the operation of the drive signal generation section 10C based on the supplied information. The system control 12 includes a recording control (not shown). The recording control controls operations of the storage 126 of the signal output system 10D and the buffer 116 in response to a timing control signal 12c from the system control 12.

Now, the operation of the digital still camera 10 constructed as discussed above will be described. First, description will be made on the whole-pixel reading out usually carried-out. The digital still camera 10 is normally provided with the image pickup device 104 capable of performing whole-pixel reading out. Thus, if an indication of the still picture shoot mode is produced by the release button 128, a light incident through the color separation filter CF of the honeycomb type stripe pattern is received by the entire photosensitive array. Each photosensitive cell 104a performs photoelectric conversion upon having received the light, and then accumulates signal charges.

Figure 5:
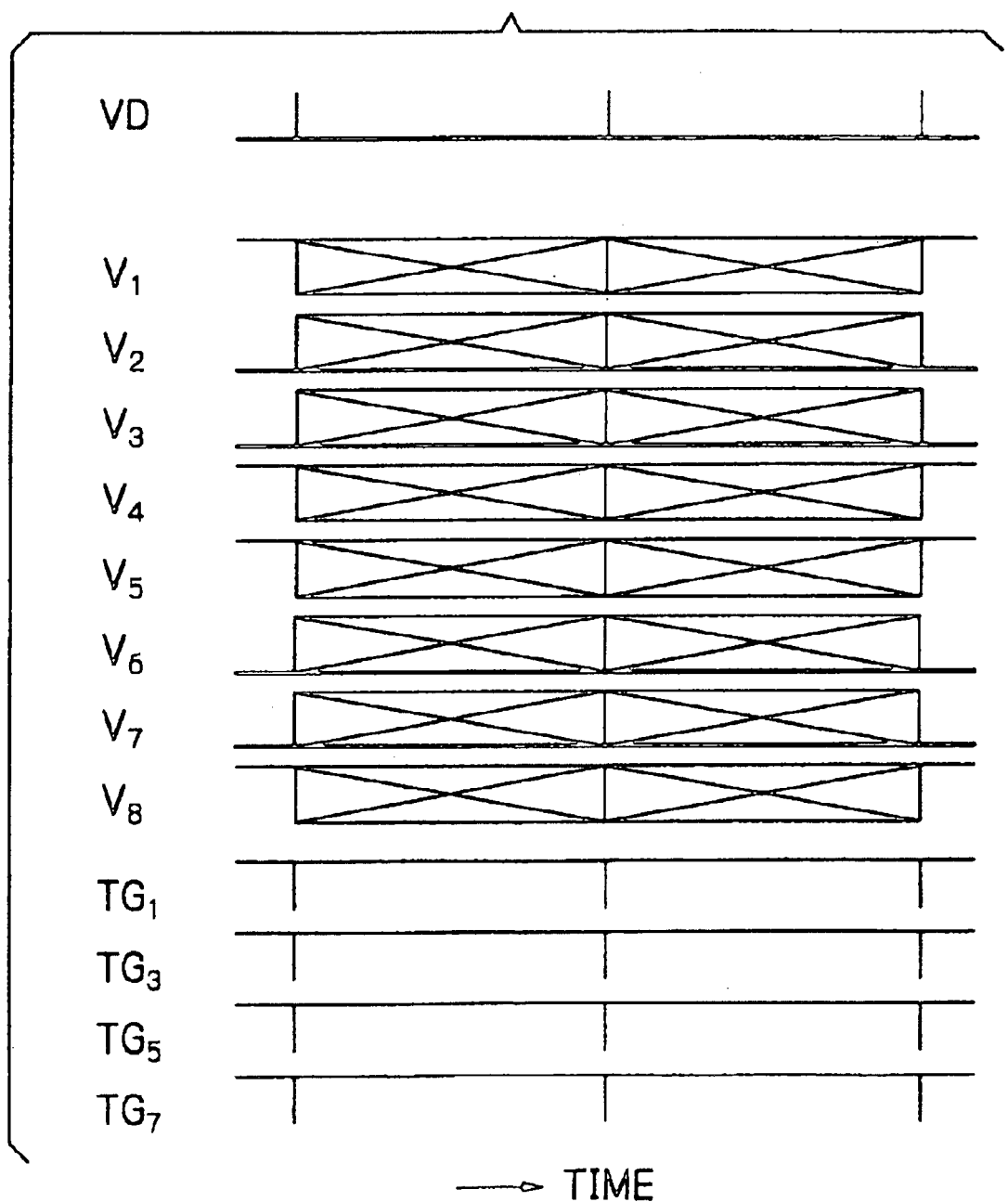
FIG. 5 is a timing chart showing a vertical synchronous signal, a vertical timing signal and a transfer gate signal when a whole-pixel reading out is performed by the drive signal generator shown in FIG. 1B.

To read out the accumulated signal charges from the photosensitive cells 104a, as shown in FIG. 5, the signal generation section 120 generates a vertical synchronous signal VD. Also, the signal generation section 120 generates vertical timing signals $V_1$ to $V_8$ to be supplied to the transfer devices V1 to V4 and V5 to V8 of the vertical transfer path 104c and transfer gate signals $TG_1$, $TG_3$, $TG_5$ and $TG_7$ to be supplied to the signal reading out gate 104b in synchronization with the vertical synchronous signal VD. FIG. 5 schematically shows that in each vertical synchronization period of time, the vertical timing signals $V_1$, $V_4$, $V_5$ and $V_8$ are negative signals, and the vertical timing signals $V_2$, $V_3$, $V_6$ and $V_7$ are positive signals. It can be understood that the transfer gate signals $TG_1$, $TG_3$, $TG_5$, and $TG_7$ are generated to read out signal charges in synchronization after the inputs of the vertical synchronous signal VD from each photosensitive cell. The timing relationship can be understood from FIG. 6, which is enlarged in time axis.

More specifically, in this stage, signal charges are read out only from the photosensitive cell in a position associated with the vertical timing signals $V_1$ and $V_5$ when the transfer gate is switched ON, and no field shift is carried out until a next vertical synchronous signal is supplied (also see FIG. 5). Then, after field shift, the vertical timing signals are supplied in sequence in synchronization with a horizontal synchronous signal HD. The supply of these signals causes the signal charges shifted to the vertical transfer path 104c to be transferred toward the horizontal transfer path 104d.

Figure 6:
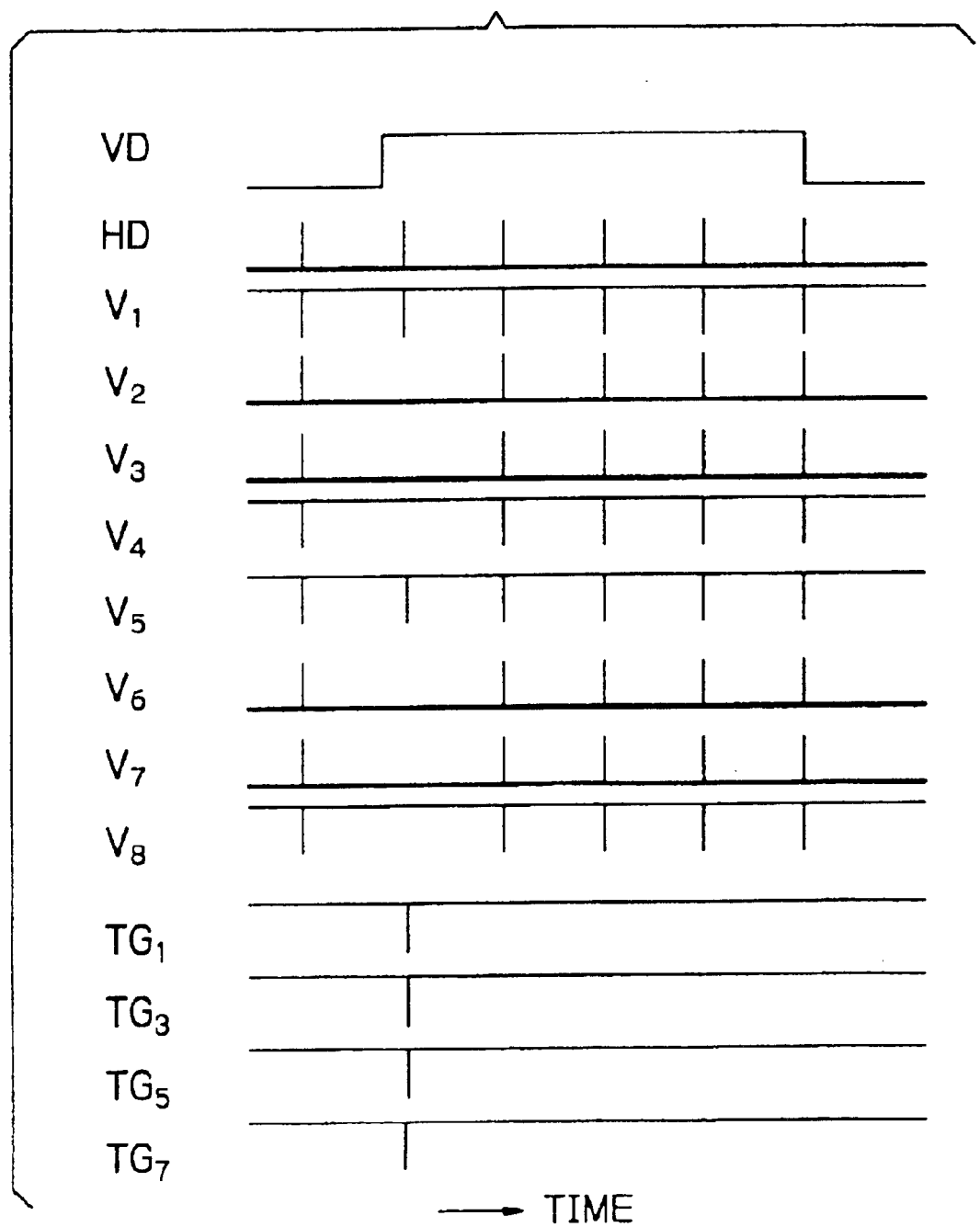
FIG. 6 is a timing chart showing the vertical synchronous signal, the vertical timing signal and the transfer gate signal with the leading edge portion of the vertical synchronous signal of FIG. 5 is depicted in an enlarged scale.
Figure 7:
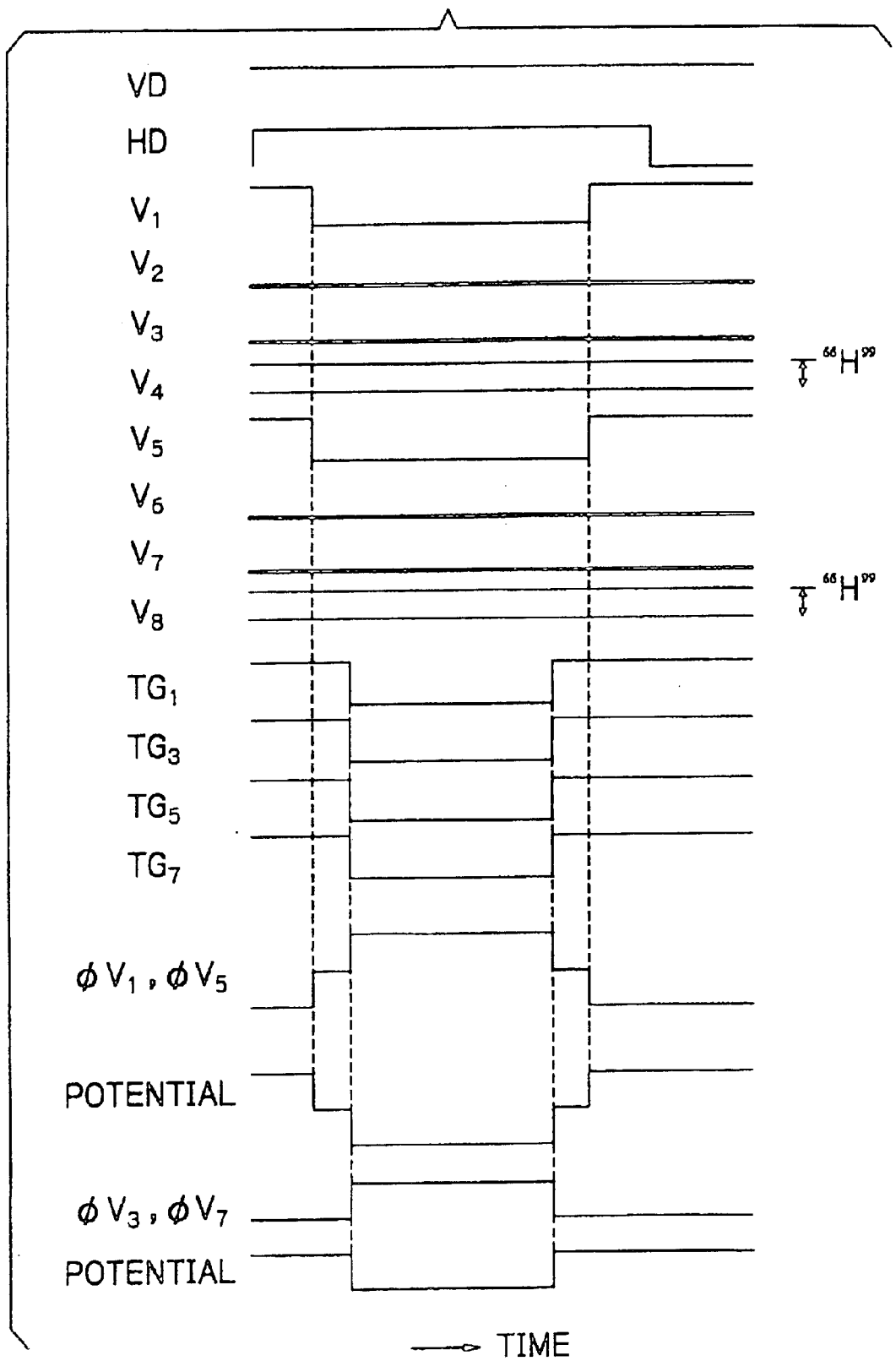
FIG. 7 is a timing chart illustrating the vertical synchronous signal, a horizontal synchronous signal, the vertical timing signal, the transfer gate signal, a drive signal and a potential generated by the drive signal in the vicinity of a leading edge portion of the horizontal synchronous signal shown in FIG. 6 in an enlarged scale.

FIG. 7 shows in an enlarged scale the timings of the vertical timing signals and the transfer gate signals after the vertical synchronous signal VD has been changed to its level "H" and the horizontal synchronous signal HD has risen in the timing relations of FIG. 6. Especially, after the vertical timing signals $V_1$ and $V_5$ and the transfer gate signals $TG_1$ and $TG_5$ have been supplied to the driver section 122, vertical drive signals $\phi V_1$ and $\phi V_5$ are output to the image pickup device 104. Subsequently, potentials shown in FIG. 7 are formed in the vertical transfer devices V1 and V5. Since the transfer gate signals $TG_3$ and $TG_7$ are also switched ON, vertical drive signals $\phi V_3$ and $\phi V_7$ are generated. Accordingly, the potentials are formed as shown in FIG. 7.

Figure 8:
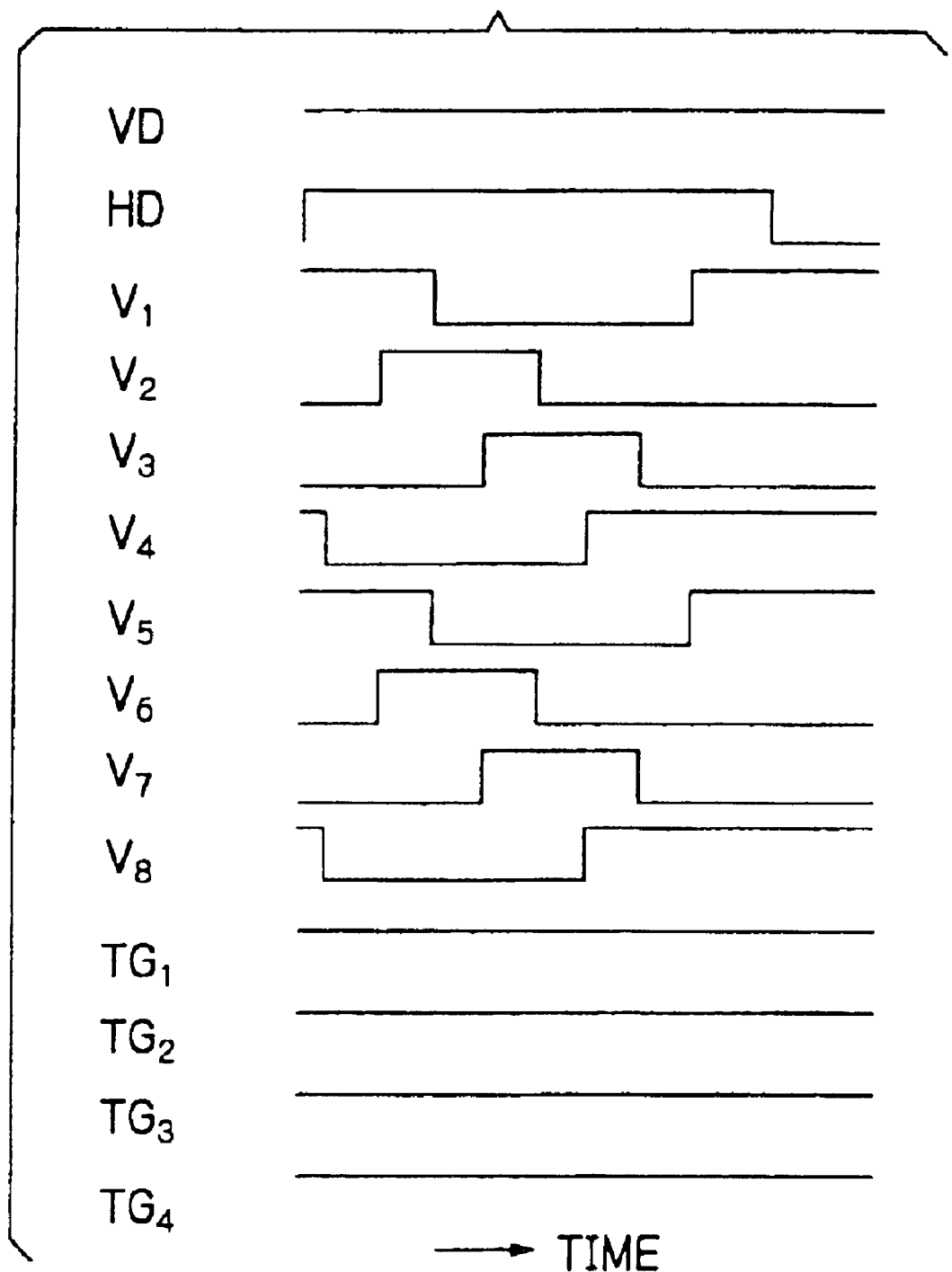
FIG. 8 is a timing chart useful for understanding the phase relationship between the vertical timing signals used for generating signals of a four-phase drive in the image pickup device shown in FIG. 1A.

FIG. 8 is a timing chart showing how the signal charges shifted to the vertical transfer path 104c are transferred toward the horizontal transfer path 104d. The vertical transfer path 104c is indicated in the form of vertical transfer devices V1 to V8. It can understood that two identical vertical drive signals are supplied respectively to the vertical transfer devices V1 to V4 and the vertical transfer devices V5 to V8. In other words, driving is performed by four signals having different phases. After the line shift has been performed for the vertically transferred signal charges, signal charges of all the pixels are read out from the image pickup device 104 at once within a specified period of time by transferring the horizontal transfer paths 104d in sequence.

Consideration is now given to typical image pickup operations procedures of the digital still camera 10. First, in the digital still camera 10, a photometry or light measurement is performed for an object field before an image pickup. To pick up an image of the object field, the release button 128 is depressed to its half stroke, thus setting the photometry mode. In this case, to perform AF adjustment control, only color G from signals obtained by the photoelectric conversion in the image pickup device 104 of the image pickup system 10A is extracted. This is because the information of color G, occupying about 70% of the luminance information, is only necessary for performing the AF adjustment control. In the light measurement in the auto focusing AF, pixel information must be repeatedly read out until an appropriate value is detected. Thus, there is a request for reading out signal charges at a speed as high as possible.

On the other hand, to perform AE and AWB adjustment control, as information about all colors is necessary, such single color reading out is not sufficient, but rather all color components of the color separation are used. More detailed description will be made later of the ways of generating and supplying the drive signal 122a and performing high-speed signal reading out in connection with driving of the image pickup device 104 when the AE and AWB adjustment control is performed according to the embodiment. As described above, in the photometry mode, reading out of single color G and thinning and reading out of all the colors are carried out.

The picture signal 10a obtained by the image pickup system 10A following the light measurement is then supplied to the signal processing system 10B under the control of the system control 12. In the signal processing system 10B, the supplied picture signal 10a is converted into a digital signal 10c by the A/D converter 112 through the pre-processor 110. The image data 10c obtained by the conversion is then supplied to the system control 12 in the form of light measurement information, although not shown. The system control 12 uses this light measurement information for further processing. In the processing, the system control 12 generates control signals 12a for AE control and also for AF control, and outputs these control signals respectively to the AF and AE control 106 and 108. The AF and AE control 106 and 108 perform the AF and AE controls in response to the control signals 12a supplied through the respective mechanisms incorporated therein. These adjustments are carried out repeatedly in the above mode.

Then, the user further depresses the release button 128 to its full stroke at a desired image shooting timing. At this time, a signal recording for an image of the object field is supplied to the system control 12. As in the case of the previous mode, the image pickup system 10A performs image pickup for a light incident from the object field. In this still picture shoot mode (the whole-pixel reading out), however, processing for taking out all the colors is carried out in the image pickup device 104 without any pixel thinning. Before the image pickup, needless to say, a drive signal to be supplied is different from that in the previous signal reading out.

The picture signal 10a produced is converted into a digital signal 10c by the A/D converter 112 of the signal processing system 10B, and then supplied to the signal processor 114. The signal processor 114 performs a signal processing on the image data corresponding to a luminance signal and a color difference signal so as to be extended to a higher frequency band. Then, obtained image data 10d is supplied through the buffer 116 to the compressor/decompressor 118. The compressor/decompressor 118 performs a compression on a signal 10f, and outputs the compressed signal to the signal output system 10D. In the still picture shoot mode, the image data 10f of all the pixels supplied under the control of the recording control section in the system control 12 is recorded in the storage 126. The storage 126 will develop the recorded image data under the control of the recording control section.

Thus, the digital still camera 10 can be used for both of the photometry mode and the still picture shoot mode by manipulating release button 128. In the digital still camera 10, including an image pickup device having a large number of pixels exceeding one million, in the still picture shoot mode, time necessary for reading out the all pixels of an image signal is not such a big problem except when continuous shooting is carried out. But in the photometry mode, as described above, reading out time needs to be shortened when AE or AF control is performed. Next, description will be made of operations of the image pickup device 104 and the drive signal generation section 10C in the photometry mode for performing AE control in the digital still camera 10 by using the image pickup system 10A having the above-described specifications.

Figure 9:
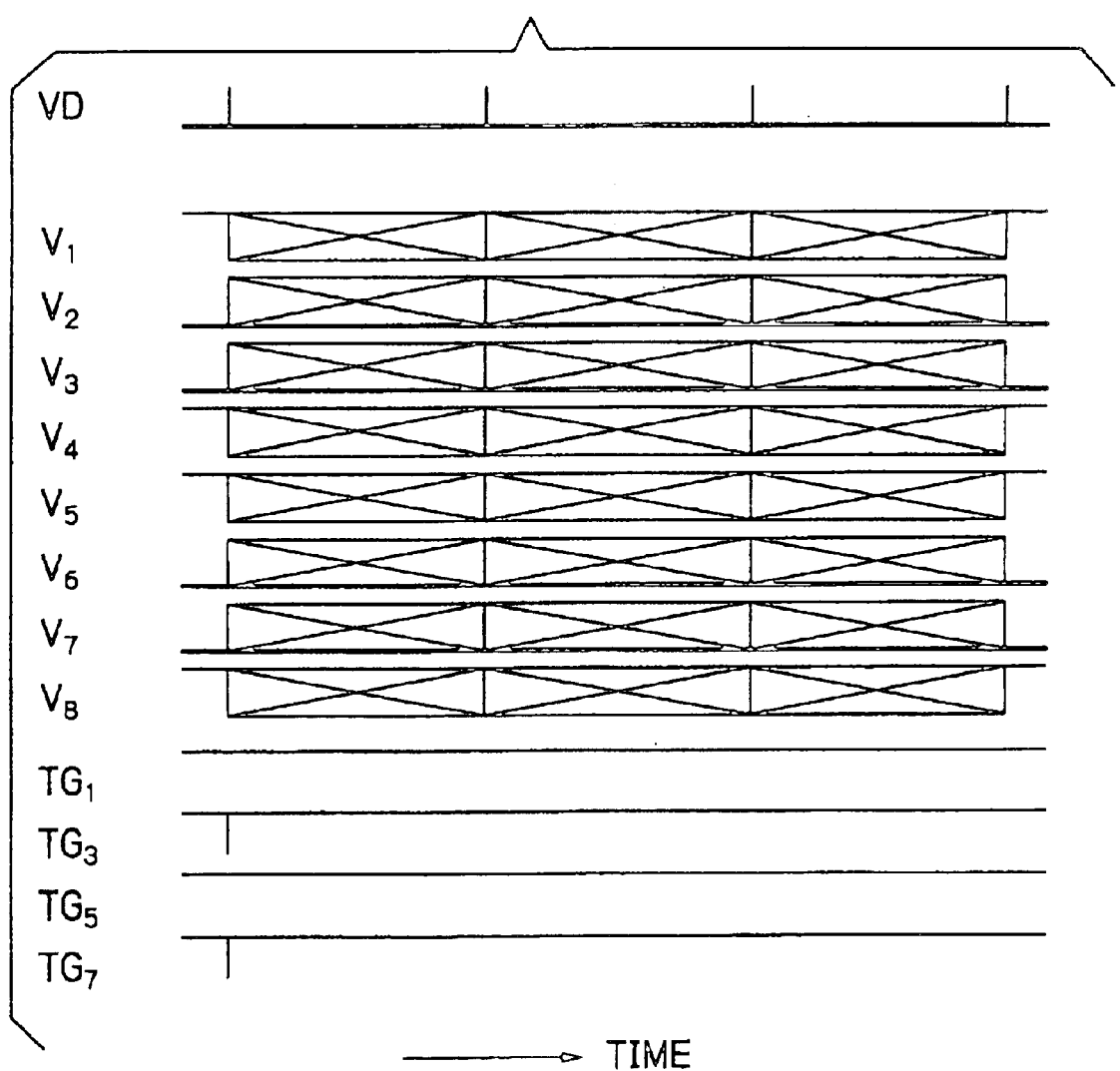
FIG. 9 is a timing chart depicting the vertical synchronous signal, the horizontal synchronous signal, the vertical timing signal and the transfer gate signal, which are generated by a signal generator when signal charge only for a color G is read out in the image pickup device shown in FIG. 1A in a mode of controlling a light measurement.

As the honeycomb type stripe pattern is employed for the color separation filters CF, it can be understood from FIG. 4 that the photosensitive cells 104a of color R are adjacent to the vertical transfer devices V1 and V5, and the photosensitive cells 104a of color G are adjacent to the vertical transfer devices V3 and V7. In this case, the transfer gate signals $TG_3$ and $TG_7$ are supplied to make the signal reading out gates 104b adjacent to the vertical transfer devices V1 and V5 is switched to the OFF state thereof, and the signal reading out gates 104b adjacent to the vertical transfer devices V3 and V7 is switched to the ON state thereof. These timing relations are shown in FIG. 9. The other transfer gate signals TG$_1$ and TG$_5$ are at "H" levels. Accordingly, the signal reading out gates 104b adjacent to the vertical transfer devices V1 and V5 are in the OFF states thereof, so that signal charges of colors R, G and B cannot be read out. These relations are indicated by the hatched pixels of reading out prohibited lines of signal charges and reading out permitted lines of signal charges shown in FIG. 10.

Figure 11A:
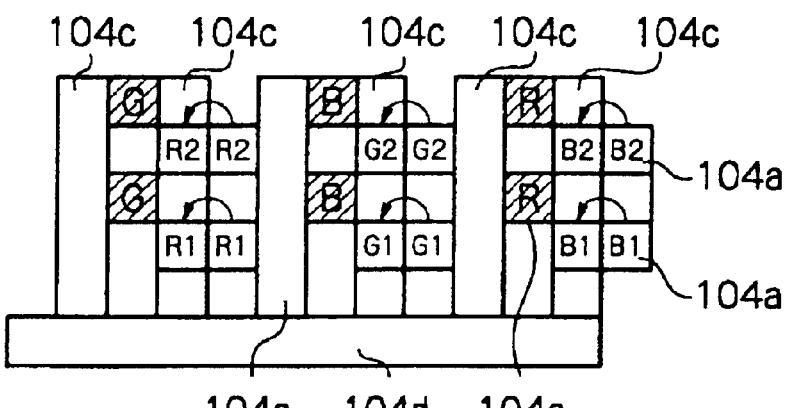
FIGS. 11A, 11B and 11C are schematic plan views, which illustrate the states of field shift, vertical transfer and horizontal transfer, respectively, in signal-charge reading out operated in response to a drive signal supplied based on the signal of FIG. 9 generated by the signal generator.

Because of the above relations, as shown in FIG. 11A, signal charges are read out from the photosensitive cells R1, G1, B1, R2, G2, B2, and so on, to the vertical transfer paths 104c. The signal charges read out to the vertical transfer paths 104c are then transferred in sequence toward the horizontal transfer path 104d as described above. At this time, all the signal charges in the vertical transfer paths 104c are moved in the lower direction by transfer distances corresponding to two lines. As a result, the signal charges of the photosensitive cells R1, G1 and B1 closest to the horizontal transfer path 104d are supplied to the horizontal transfer path 104d.

Figure 11B:
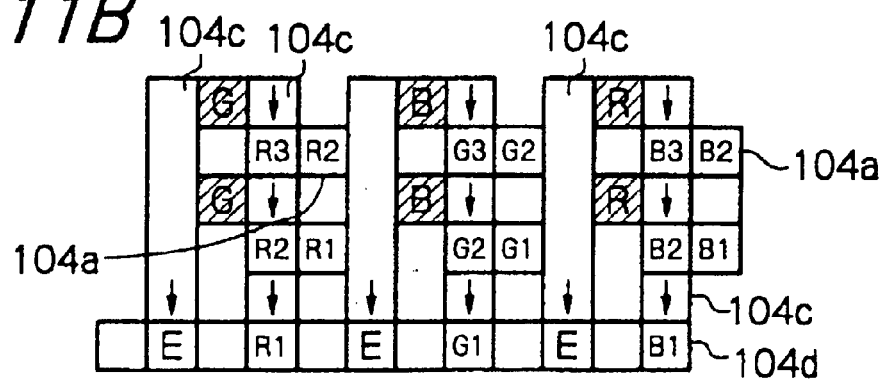
Figure 11C:
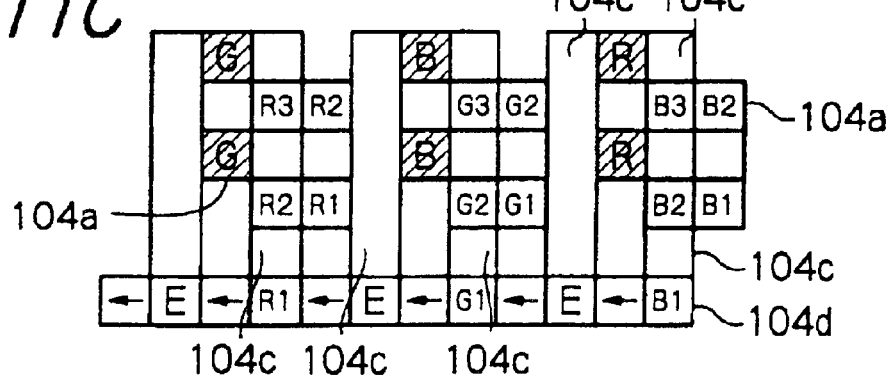
Figure 12A:
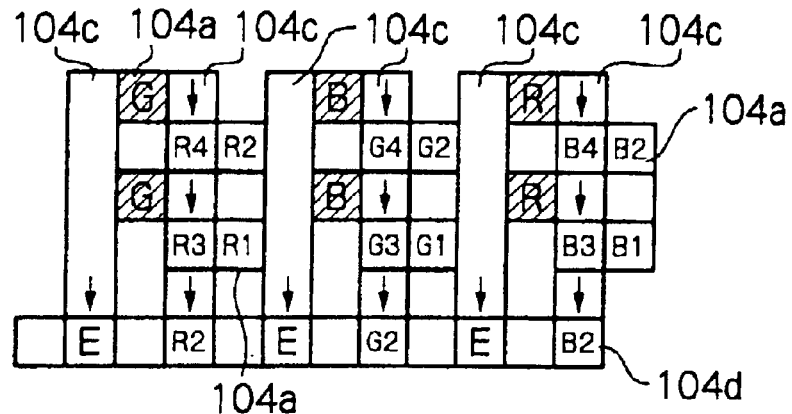
FIGS. 12A and 12B schematically illustrate vertical and horizontal transfers, respectively, carried out after the signal reading out of FIG. 1C.
Figure 12B:
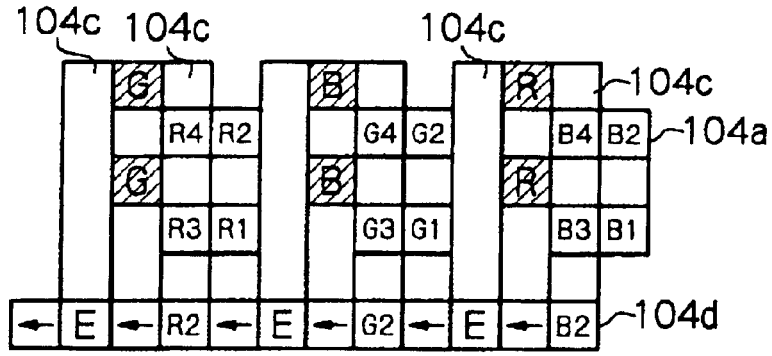

Accordingly, the signal charges of the photosensitive cells R1, G1 and B1 are moved by two lines, but the movements thereof in the second lines are line-shifted. Since no signal charges are read out from the photosensitive cells indicated by hatched lines, a transfer device in the horizontal transfer path 104d which the signal charges should have entered is indicated by symbol E (emptiness or lack of signal charge), see FIG. 11B. Then, the signal charges E, R1, E, G1, E, B1, and so on, that have reached the horizontal transfer path 104d are transferred in sequence to the amplifier 104e arranged on the output side (not shown in FIG. 11), and output from the latter. Subsequently, all the signal charges remaining in the vertical transfer paths 104c are moved in the lower direction again by two lines (see FIG. 12A). Then, the signal charges E, R2, E, G2, E, B2, and so on, that have reached the horizontal transfer path 104d, are transferred in sequence toward the amplifier 104e arranged in the output side, and output from the latter (see FIG. 12B).

Figure 10:
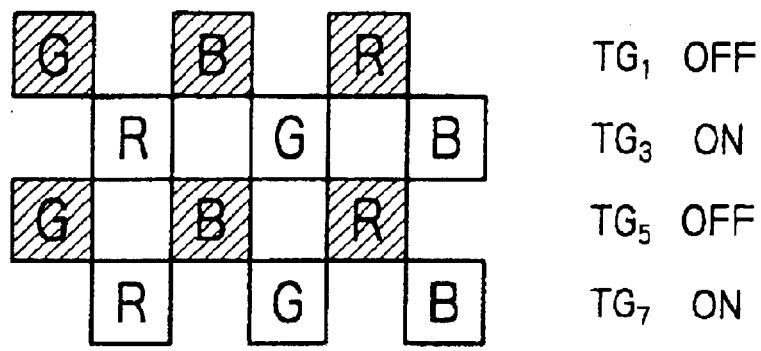
FIG. 10 is a schematic plan view useful for understanding the positional relationship of the photosensitive cells from some of which signal charges are actually read out and from the others of which no signal charges are read out in response to the supplied transfer gate signals shown in FIG. 9.

By the above-mentioned transfer of the signal charges, the signal charges only from the photosensitive cells indicated by the hatched lines in FIG. 10 are read out. In the arrangement of FIG. 10, the ½ thinning is carried out both in the horizontal and vertical directions. However, this arrangement employs the honeycomb-like structure as described above, where the pitches of pixel shifting are offset by ½ in the vertical and horizontal directions. Thus, the number of actually read out pixels is not equal to the number of pixels of the ¼ thinning of all the pixels, even when the ½ thinning is performed both in the vertical and horizontal directions. Reading-out of the signal charges to the vertical transfer device is not carried out, so that by dealing with that element of the device as "E" in this transfer device, the signal charges can be processed exactly like actual signal charges.

In other words, in the vertical transfer, these signal charges "E" can be ignored, whereas in the transfer of a horizontal direction, transfer is carried as if the signals "E" had signal charges "E" occupying the positions of one transfer device. Accordingly, the number of the transfer stages through which the horizontal transfer is made is the same as that of the transfer stages encountered when no thinning is carried out (see FIGS. 11C and 12B).

Thus, the inventor studied the way of reading out signal charges to perform the ½ thinning also in the number of transfer stages in the horizontal direction. The procedures are as follows. As shown in FIG. 11A, signal charges are read out. Then, in the vertical transfer also, all the signal charges read out on a two-line (two-stage) basis are transferred in the same manner as in the case shown in FIG. 11B. Thus far, the procedures are the same as those in the previous procedures.

Figure 13A:
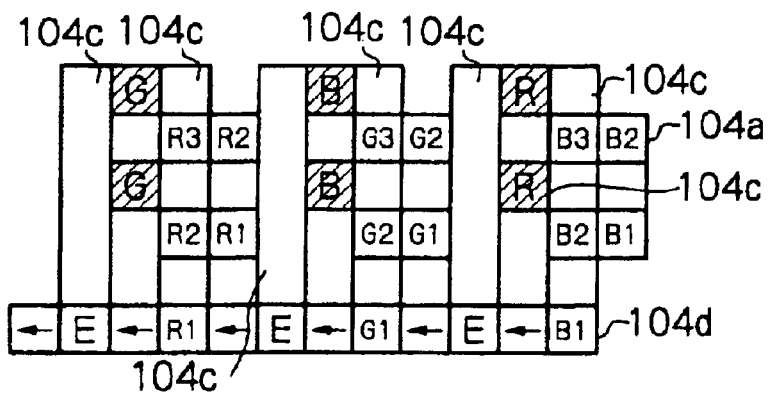
FIGS. 13A and 13B schematically illustrate the states of vertical and horizontal transfers in a process improved from the thinning of FIGS. 11A–12B.

Then, in the horizontal transfer, the signal charges are moved by two stages on the transfer path 104d in the horizontal direction. For this reason, the horizontal transfer path 104d has a structure capable of holding at least extra transfer devices equivalent to two stages to hold the signal charges. In this case, as a line of signals not to be read out is provided, a transfer device equivalent to one stage only needs to be added. As a result, the signal charges of colors R, G and B are sent directly below the vertical transfer paths for transferring "E" (see FIG. 13A). Then, the same vertical transfer as that described above is carried out by two lines. In this way, the remaining signal charges are transferred in the lower direction by two stages. Areas "E" exist in positions where the colors R1, G1 and B1 were located before the transfer, i.e., directly below the vertical transfer paths. Signal charges R2, G2 and B2 are vertically transferred to the positions of "E" by two lines (see FIG. 13B). In both FIGS. 13A and 13B, even if the signal charges are transferred to the positions indicated by signal charges "E" no mixing occurs between "E" and any one of transferred colors R, G and B. Accordingly, the signal charges of colors R1, R2, G1, G2, B1 and B2 are held without being mixed.

Figure 13B:
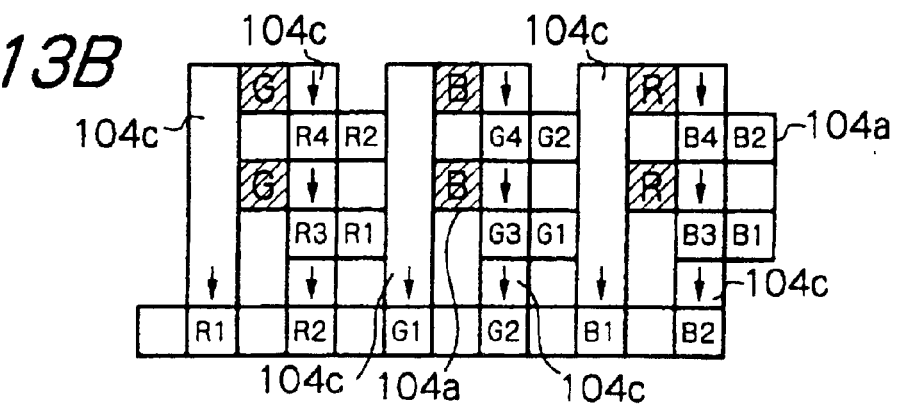
Figure 14:
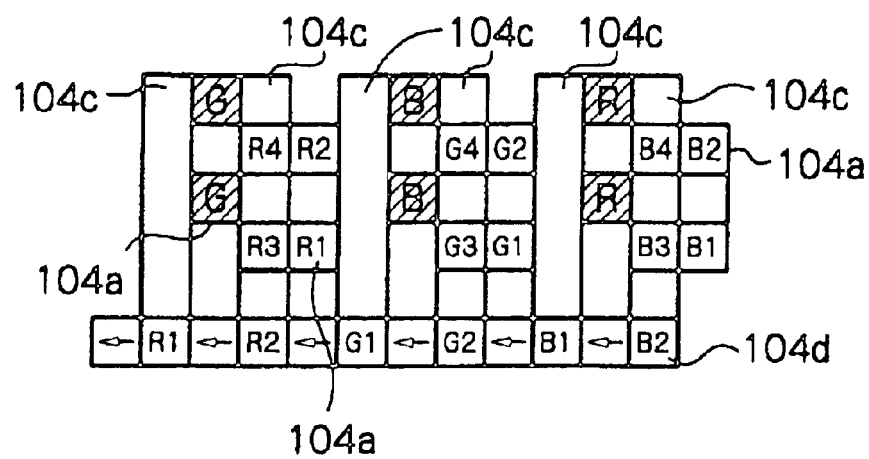
FIG. 14 is a schematic view illustrating a state continuing from the improved thinning process of FIGS. 13A and 13B.

As a result, the signal charges of colors R, G and B equivalent to two lines are housed in the horizontal transfer path 104d of FIG. 13B. In the horizontal transfer after the second vertical transfer, all the signal charges R1, R2, G1, G2, B1, B2, and so on, of two lines of the color are read out at once from the horizontal transfer path 104d. This transfer processing enables the signal charges equivalent to two lines to be read out within the time period of usual one-line reading out (see FIG. 14). In other words, the ½ thinning is carried out in the horizontal direction.

By the foregoing procedures, the ½ thinning is performed both in the horizontal and vertical directions. Accordingly, compared with the time for the whole-pixel reading out, required time can easily be shortened by ¼. It may be advisable to prevent any signal charges from remaining in the transfer paths by performing high-speed transfer before reading out.

Figure 15:
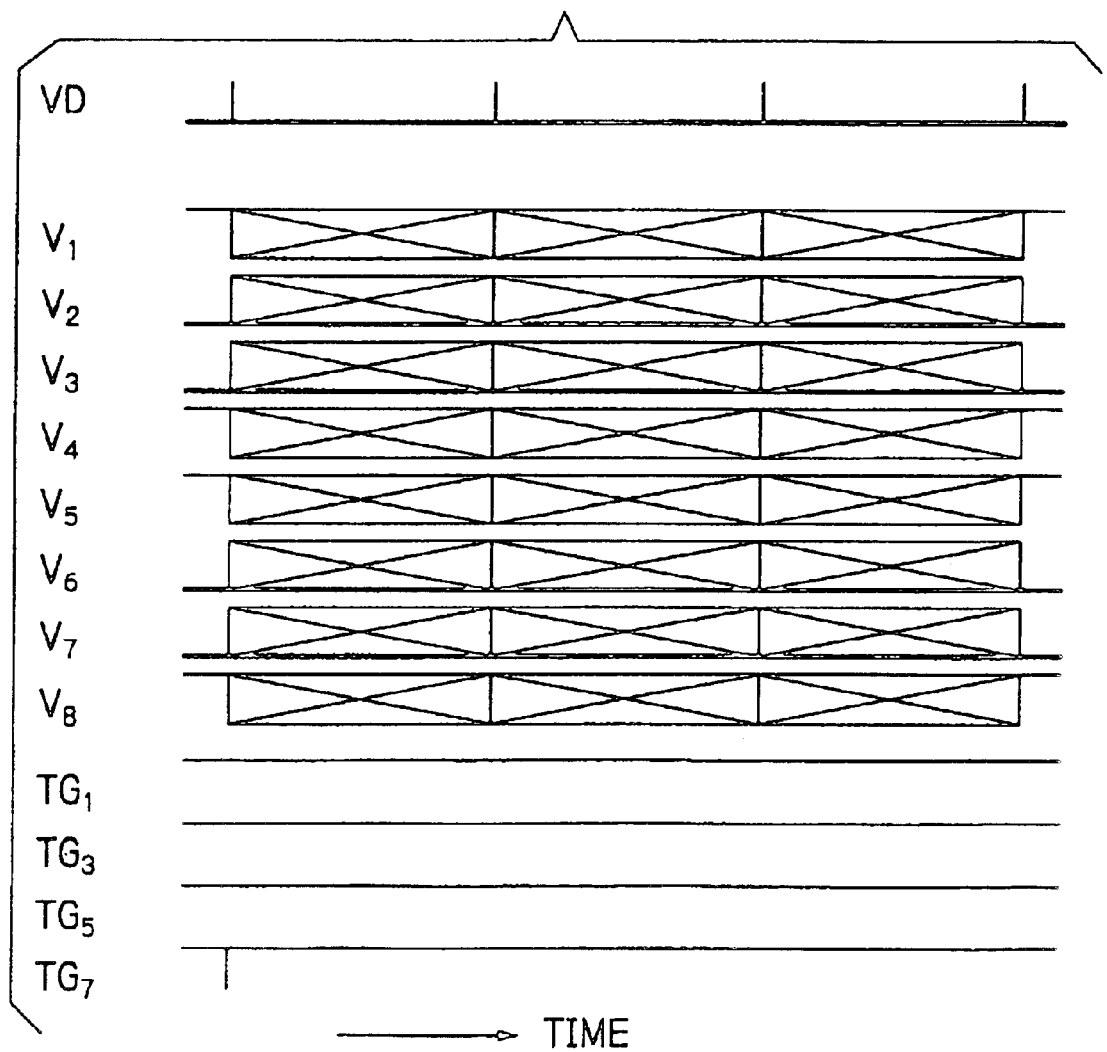
FIG. 15 is a timing chart useful for understanding a timing relationship when ¼ thinning is performed in a vertical direction in the image pickup device of the digital still camera in the photometry control mode.
Figure 16:
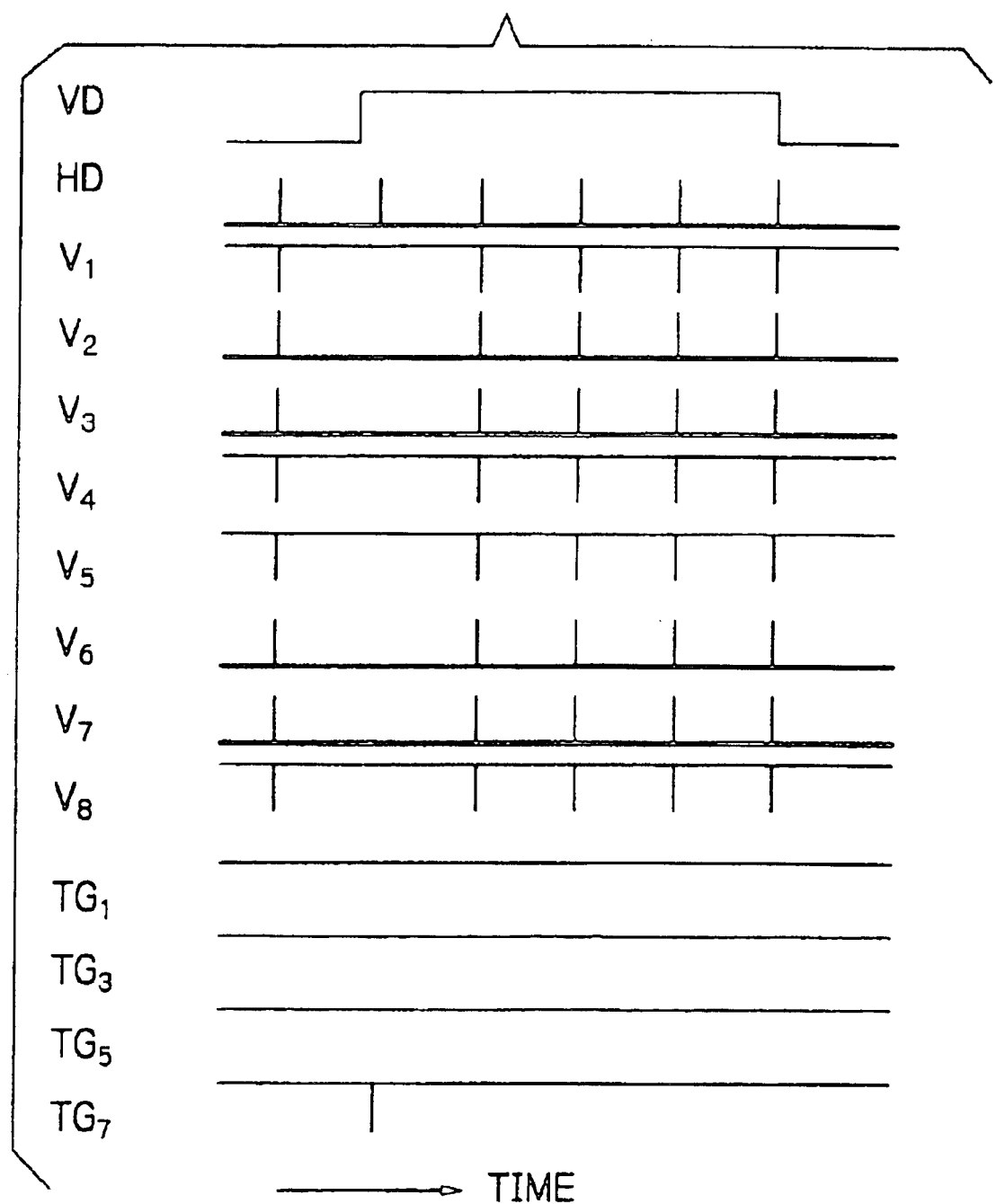
FIG. 16 is a timing chart useful for understanding the relationship between a vertical synchronous signal, vertical timing signals and transfer gate signals in the vicinity of the positive-going edge of the vertical synchronous signal of FIG. 15 in an enlarged scale.
Figure 17:
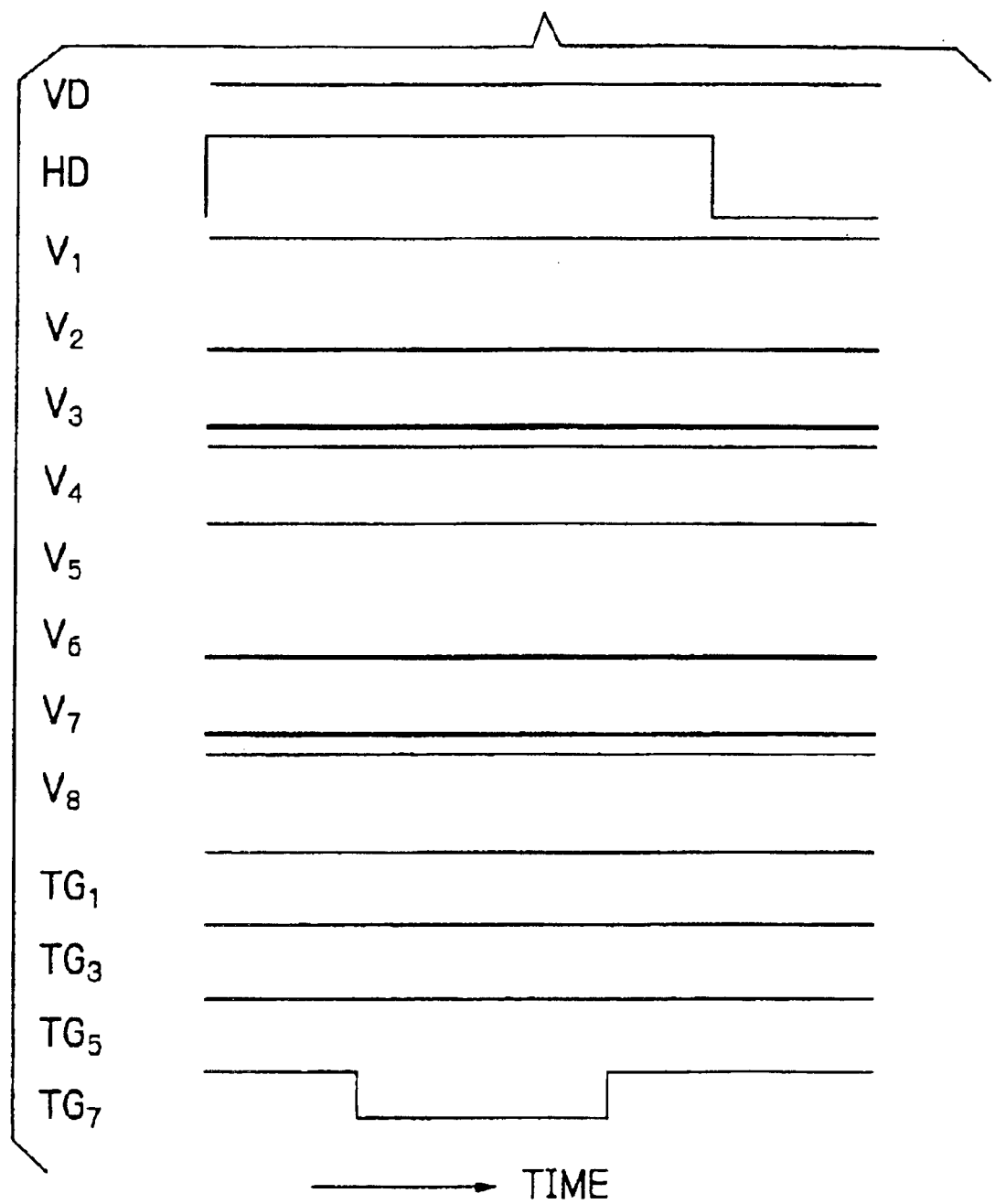
FIG. 17 is a timing chart useful for understanding relationship between the vertical synchronous signal, the horizontal synchronous signal, the vertical timing signals and the transfer gate signals in the vicinity of the positive-going edge of the horizontal synchronous signal of FIG. 16 in an enlarged scale.

To perform the ¼ thinning for reading out of all the pixels, for example, as shown in FIG. 15, a pulse is applied to the transfer gate signal TG$_7$. In response to this pulse, the signal reading out gate is switched ON for one line. This situation of FIG. 15 is shown more specifically in FIGS. 16 and 17, which are timing charts showing a horizontal synchronous signal HD in an enlarged scale.

Figure 18A:
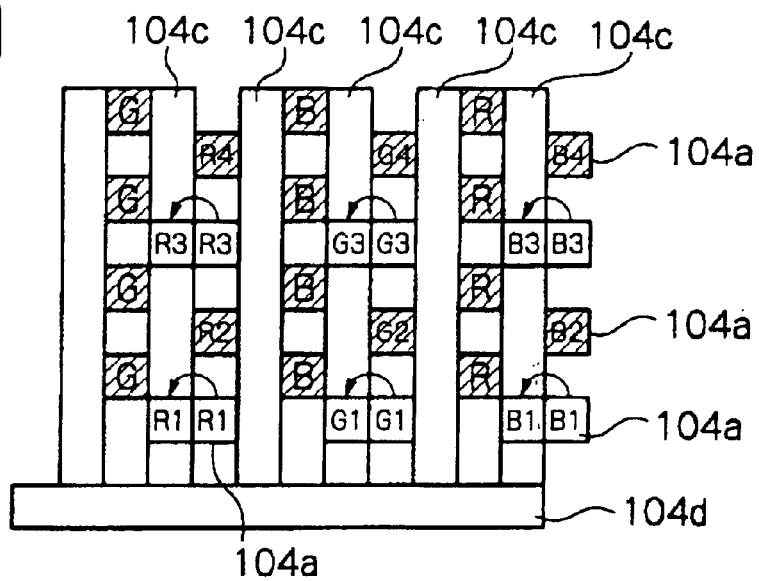
FIGS. 18A, 18B and 18C schematically illustrate the transferring processes of the ¼ thinning in a vertical direction shown in FIG. 15 and the improved type of thinning (½) shown in FIGS. 13A and 13B.
Figure 18B:
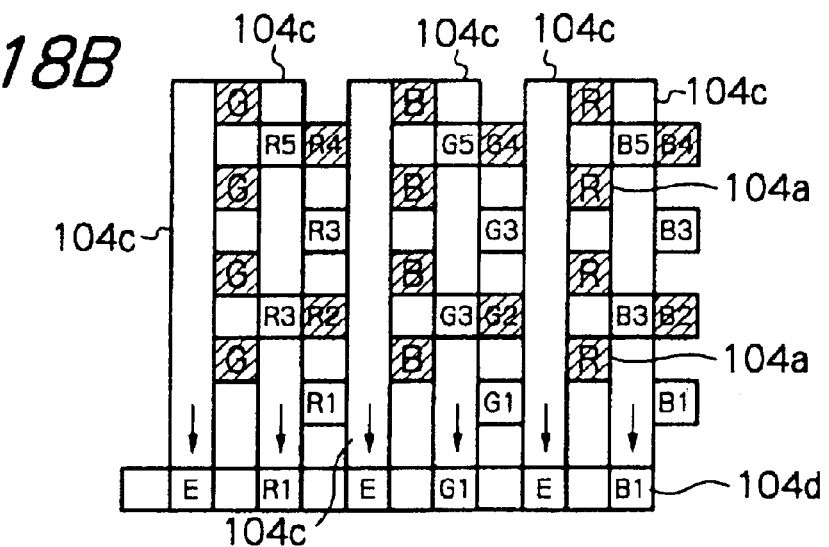

A drive signal thus obtained from the transfer gate signal TG$_7$ is supplied to the image pickup device 104. Upon having received the drive signal, first, as shown in FIG. 18A, paying attention to the photosensitive cells adjacent to each other in two lines, for example, transfer gate signals TG$_1$ and TG$_3$ are supplied to the line of color G of the left end adjacent to color R, and transfer gate signals TG$_5$ and TG$_7$ are supplied to the line of color R held between colors G and B. In this relation, if the transfer gate signal TG$_7$ is supplied, to drive each four photosensitive cells arranged in two lines, signal charges accumulated by light receiving are read out only from one photosensitive cell. At this stage, the signal reading out has been done to a quarter of the entire pixels. The further transfer in the vertical (column) direction is carried out in the lower direction on a two-stage basis in the vertical transfer paths 104c (see FIG. 18B).

Figure 18C:
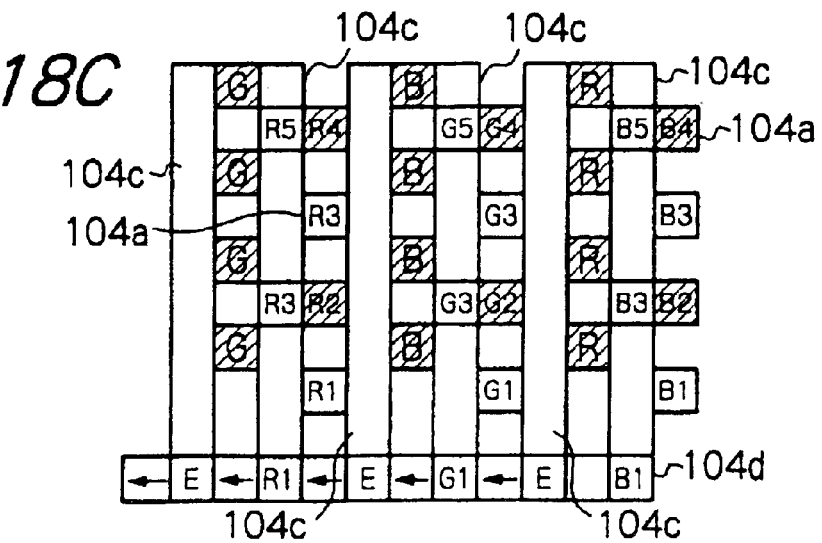
Figure 19A:
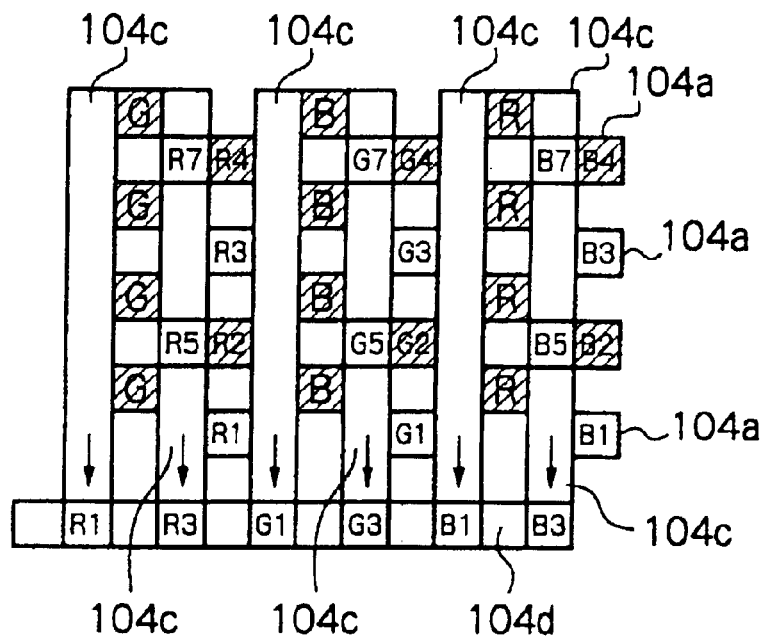
FIGS. 19A and 19B are schematic views useful for understanding the flow of signal charges in the image pickup device after the transfer of FIG. 18C.
Figure 19B:
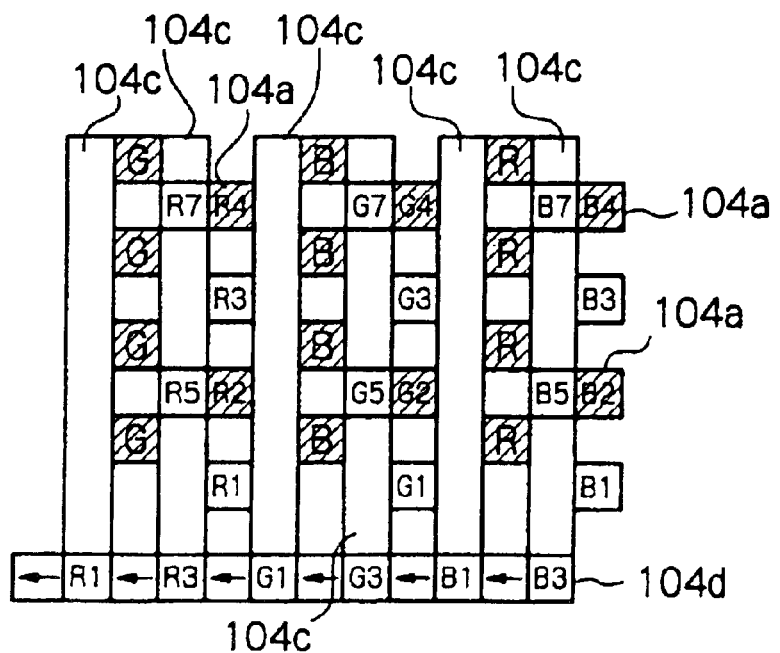

The signal charges supplied to the horizontal transfer path 104d are transferred toward the output side on a two-stage basis (see FIG. 18C). After this transfer, vertical transfer is carried out by two stages (see FIG. 19A). In this way, the signal charges equivalent to four lines in amount are stored altogether in the horizontal transfer path 104d. The stored signal charges are then read out to a next horizontal transfer path (see FIG. 19B). By such horizontal transfer, the ½ thinning is performed by reading out from two lines at once. For this signal reading-out, the thinning results in ¼×½=⅛ considering the overall transfer in the horizontal and vertical directions. From the four transfer gate signals, one may be selected.

In the foregoing example, the rate of thinning in the horizontal direction was ½. Next, description will be made of a process of transfer where thinning in the horizontal direction is set to ¼ which is the same as in the case of the rate of thinning in the vertical direction. As shown in FIG. 20A, by supplying a pulse of the transfer gate signal $TG_7$, signal charges of colors R1, G1, B1, and so on, and colors of R3, G3, B3, and so on, are read out to the respective vertical transfer paths 104c. It may be advisable to completely prevent any charges from remaining in the transfer paths by performing high-speed transfer before reading out of these signal charges.

In the initial vertical transfer, the signal charges in the vertical transfer paths 104c are transferred by two stages. As a result, colors R1, G1, B1, and so on, are supplied to the horizontal transfer path 104d (see FIG. 20B). Subsequently, the vertical transfer based on a process different from the conventional process is carried out. In other words, all the signal charges remaining in the vertical transfer paths 104c are transferred by four stages. By this transfer, the signal charges of colors R3, G3, B3, and so on, are supplied to the horizontal transfer path 104d. In the transfer devices of the horizontal transfer path 104d directly below the vertical transfer paths 104c from which the signals have been read out, the signals of identical colors, i.e., colors (R1+R3), (G1+G3) and (B1+B3), are combined (see FIG. 20C). At this time, in the transfer devices of the horizontal transfer path 104d directly below the vertical transfer paths 104c from which no signal charge reading-out has been carried out, no changes occur with "E" added. From the horizontal transfer path 104d the stored signal charges are transferred toward the output side by two stages (see FIG. 20D).

Figure 21A:
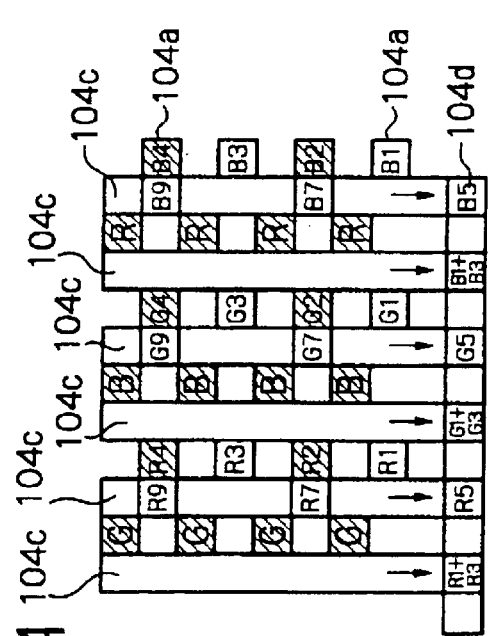
FIGS. 21A, 21B and 21C are schematic views useful for understanding the flow of signal charges in the image pickup device after the transfer of FIG. 20D.
Figure 21B:
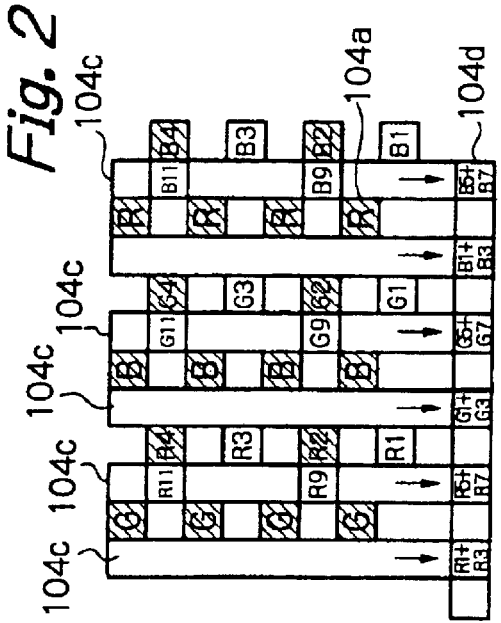
Figure 21C:
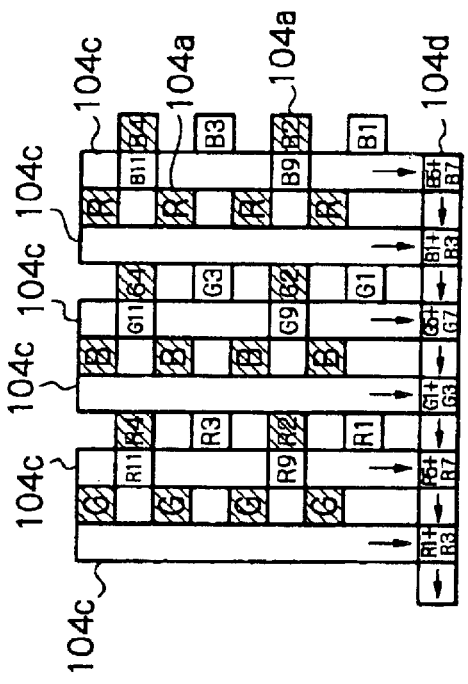

For vertical transfer thereafter, transfer of four stages is repeated by twice. In the first transfer, as shown in FIG. 21A, the signals of colors R5, G5 and B5 are supplied to the horizontal transfer path 104d. In the next second transfer, the signals of colors R7, G7 and B7 are supplied to the horizontal transfer path 104d. In this way, in the transfer devices which have received the signal charges by the first transfer, the signals of identical colors, i.e., colors (R5+R7), (G5+G7) and (B5+B7), are synthesized (see FIG. 21B). By such signal synthesizing of the identical colors, the thinning in the transfer of the horizontal direction will result in ¼ in total by further thinning the signal charges by ½ in the horizontal direction. After the signal synthesizing, all the signals stored in the horizontal transfer path 104d are output. For this signal reading out, the thinning results in ¼×¼=1/16 for all the pixels.

With the above-described constitution, the present situation in which the trial to meet the demand for a high integration of the photosensitive array obstructs antinomically the high-speed reading out of the signal charge can be comparatively easily solved by accurately reading out all the colors to be used. Thus, the present invention can be used for the AE and AWB control which requires the fast reading out of the signal charge from the image pickup device. Since the image pickup section serves as a light measurement sensor, a dedicated light measurement sensor can be omitted.

The entire disclosure of Japanese patent application No. 200681999 filed Jan. 28, 1999 including the specification, claims, accompanying drawings and abstract of the disclosure is incorporated herein by reference in its entirety.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A solid-state image pickup apparatus including a plurality of photosensitive cells for performing a photoelectric conversion for incident light arranged two-dimensionally in a photosensitive array for receiving the incident light, the photosensitive cells being arranged obliquely adjacent to each other at positions shifted from each other by a length in row and column which is substantially equal to the half of a pitch at which the photosensitive cells are disposed in the row and column direction, wherein an image signal output from an image pickup section for transferring signal charge obtained by the photoelectric conversion by each of the photosensitive cells in response to a drive signal at a predetermined timing is converted to a digital signal, and a picture signal is generated by performing a signal processing on the digital signal, said image pickup section comprising:

a color separator having color filters for separating the incident light into at least three separated colors, arranged in the column direction; and a signal reading out section for transferring the signal charge only to transfer devices each arranged in the column direction associated with one of said photosensitive cells, said apparatus comprising:

a mode setting section for setting, among modes of reading out the signal charges from the image pickup section, either one of a whole-pixel reading out mode of reading out the signal charges from all of the plurality of photosensitive cells and a thinning reading out mode of reading out signal charges after thinning colors of the separated colors at a specified interval;

a drive signal generation section for generating a drive signal according to instruction from the mode setting section, selecting a destination to which the drive signal generated according to the selected mode is supplied and then supplying the drive signal to the destination; and a control section for controlling generation of a drive signal appropriately for the mode selected in the drive signal generation section upon receiving the instruction from the mode setting section, and signal processing executed for the image signal, in the thinning reading out mode, said drive signal generation section supplying the drive signal to selectively drive the signal reading out section adjacent to each of the photosensitive cells by every other line, said image pickup section further comprising:

a plurality of transfer devices arranged in a column direction with every eight of said plurality of transfer devices forming one unit; and a plurality of electrodes provided in said signal reading out section correspondingly to said plurality of transfer devices so that every eighth of said plurality of electrodes is interconnected to each other, the drive signal being supplied selectively through ones of the electrodes which correspond to every second or fourth line differently from the drive signal in the whole-pixel reading out mode.

2. A solid-state image pickup apparatus including a plurality of photosensitive cells for performing a photoelectric conversion for incident light arranged two-dimensionally in a photosensitive array for receiving the incident light, the photosensitive cells being arranged obliquely adjacent to each other at positions shifted from each other by a length in row and column which is substantially equal to the half of a pitch at which the photosensitive cells are disposed in the row and column direction, wherein an image signal output from an image pickup section for transferring signal charge obtained by the photoelectric conversion by each of the photosensitive cells in response to a drive signal at a predetermined timing is converted to a digital signal, and a picture signal is generated by performing a signal processing on the digital signal, said image pickup section comprising:

a color separator having color filters for separating the incident light into at least three separated colors, arranged in the column direction; and a signal reading out section for transferring the signal charge only to transfer devices each arranged in the column direction associated with one of said photosensitive cells, said apparatus comprising:

a mode setting section for setting, among modes of reading out the signal charges from the image pickup section, either one of a whole-pixel reading out mode of reading out the signal charges from all of the plurality of photosensitive cells and a thinning reading out mode of reading out signal charges after thinning colors of the separated colors at a specified interval;

a drive signal generation section for generating a drive signal according to instruction from the mode setting section, selecting a destination to which the drive signal generated according to the selected mode is supplied and then supplying the drive signal to the destination; and a control section for controlling generation of a drive signal appropriately for the mode selected in the drive signal generation section upon receiving the instruction from the mode setting section, and signal processing executed for the image signal, in the thinning reading out mode, said drive signal generation section supplying the drive signal to selectively drive the signal reading out section adjacent to each of the photosensitive cells by every other line, said drive signal generation section generating:

a first vertical drive signal for transferring the signal charges by two lines in a column direction after the signal reading-out section is driven;

a second vertical drive signal for transferring the signal charges by four lines in the column direction after the first vertical drive signal is supplied; and a first horizontal drive signal for setting a transfer distance for transferring the transferred signal charges in a row direction to two columns.

3. An apparatus in accordance with claim 2, wherein the separated colors are either one of a set of primary colors, red R, green G and blue B, a set of complementary colors, green G, yellow Ye and cyan Cy, and a set of complementary colors, gray Gray or white W, yellow Ye and cyan Cy.

4. An apparatus in accordance with claim 2, wherein in said color separator, the color filters are arranged in a column direction in a stripe shape, and a pattern having all colors set in one group is repeated in a row direction.

5. An apparatus in accordance with claim 2, wherein in the thinning reading out mode, said drive signal generation section supplies the drive signal only to one signal reading out section while a plurality of transfer devices are set as one unit.

6. A solid-state image pickup apparatus including a plurality of photosensitive cells for performing a photoelectric conversion for incident light arranged two-dimensionally in a photosensitive array for receiving the incident light, the photosensitive cells being arranged obliquely adjacent to each other at positions shifted from each other by a length in row and column which is substantially equal to the half of a pitch at which the photosensitive cells are disposed in the row and column direction, wherein an image signal output from an image pickup section for transferring signal charge obtained by the photoelectric conversion by each of the photosensitive cells in response to a drive signal at a predetermined timing is converted to a digital signal, and a picture signal is generated by performing a signal processing on the digital signal, said image pickup section comprising:

a color separator having color filters for separating the incident light into at least three separated colors, arranged in the column direction; and a signal reading out section for transferring the signal charge only to transfer devices each arranged in the column direction associated with one of said photosensitive cells, said apparatus comprising:

a mode setting section for setting, among modes of reading out the signal charges from the image pickup section, either one of a whole-pixel reading out mode of reading out the signal charges from all of the plurality of photosensitive cells and a thinning reading out mode of reading out signal charges after thinning colors of the separated colors at a specified interval;

a drive signal generation section for generating a drive signal according to instruction from the mode setting section, selecting a destination to which the drive signal generated according to the selected mode is supplied and then supplying the drive signal to the destination; and a control section for controlling generation of a drive signal appropriately for the mode selected in the drive signal generation section upon receiving the instruction from the mode setting section, and signal processing executed for the image signal, in the thinning reading out mode, said drive signal generation section supplying the drive signal to selectively drive the signal reading out section adjacent to each of the photosensitive cells by every other line, in said image pickup section, a plurality of transfer devices being arranged in a column direction with eight as one unit, the drive signal being supplied through an electrode provided in the signal reading out section and corresponding to each transfer device, independently different from that in the whole-pixel reading out mode, in the thinning reading out mode, said drive signal generation section supplying the drive signal only to one signal reading out section while a plurality of transfer devices are set as one unit, said drive signal generation section generating:

a first vertical drive signal for transferring the signal charges by two lines in a column direction after the signal reading-out section is driven;

a second vertical drive signal for transferring the signal charges by four lines in the column direction after the first vertical drive signal is supplied; and a first horizontal drive signal for setting a transfer distance for transferring the transferred signal charges in a row direction to two columns.

7. A method of reading out an image signal from a plurality of photosensitive cells for performing a photoelectric conversion for incident light arranged two-dimensionally in a photosensitive array for receiving the incident light, the photosensitive cells being arranged obliquely adjacent to each other at positions shifted from each other by a length in row and column directions which is substantially equal to the half of a pitch at which the photosensitive cells are disposed in the row and column directions, wherein an image signal output from an image pickup section for transferring signal charge obtained by the photoelectric conversion by each of the photosensitive cells in response to a drive signal at a predetermined timing is converted to a digital signal, and a picture signal is generated by performing a signal processing on the digital signal, said method comprising the steps of:

setting, among modes of reading out the signal charges, a whole-pixel reading out mode of reading out the signal charges from all of the plurality of photosensitive cells and a thinning reading out mode of reading out the signal charges by thinning colors of at least three separated colors at a specified interval;

supplying the drive signal according to selected mode by the mode setting step, selecting a destination to which the drive signal is supplied and then supplying the drive signal to the destination;

separating each of the incident lights into the separated colors;

receiving the incident light color-separated by the color separation step by each of the plurality of photosensitive cells;

reading out all the signal charges obtained by the plurality of photosensitive cells in the whole-pixel reading out mode in response to the supplied drive signal after the light receiving step, and performing a field shift for only the signal charges read out from selected one of the plurality of photosensitive cells in response to the supplied drive signal in the thinning reading out mode;

transferring the signal charges transferred in the shift step in a column direction in response to the supplied drive signal; and transferring the signal charges after transferred in the column direction transfer step and shifted by line in a horizontal direction in response to the supplied drive signal, said drive signal supply step including the substeps of:

generating a field shift signal for reading out the signal charges from each of the photosensitive cells corresponding to a line for reading in the thinning reading out mode, and supplying the field shift signal;

generating a column transfer timing signal for setting a transfer distance to two lines for transferring the signal charges in a column direction after the field shift signal is supplied, and then supplying the timing signal; and generating a row transfer timing signal for transferring and outputting the transferred signal charges in a row direction after the transfer in the column direction and the line shift are performed, and repeating the supply of the row transfer timing signal to read out the signal charges.

8. A method in accordance with claim 7, wherein the separated colors are either one of a set of primary colors, red R, green G and blue B, a set of complementary colors, green G, yellow Ye and cyan Cy, and a set of complementary colors, gray Gray or white W, yellow Ye and cyan Cy.

9. A method in accordance with claim 7, wherein in said substep of generating the row transfer timing signal, a row transfer timing signal for setting a transfer distance to two columns is generated when the transferred signal charges are transferred in a row direction, and in second one of said repeated substeps of the row transfer timing signal, all the line-shifted signal charges are read out.

10. A method in accordance with claim 7, wherein said substep of generating the column transfer timing signal includes:

a first column signal supply substep of first generating a column transfer timing signal for setting a transfer distance to two and four lines, totally six lines, when the signal charges are transferred in the column direction after the field-shifted signals are supplied, and then supplying the timing signal;

a first row signal supply substep of generating a row transfer timing signal for setting a transfer distance to two columns when the transferred signal charges are transferred in the row direction after the first column signal supply substep, and supplying the timing signal;

a second column signal supply substep of generating a column transfer timing signal for setting a transfer distance to totally eight lines, comprising a couple of four lines, when the column signal supply substep is carried out again, and supplying the timing signal; and reading out all the line-shifted signal charges after the second column signal supply substep.

11. A method in accordance with claim 7, wherein said substep of generating the column transfer timing signal includes:

a first column signal supply substep of first generating a column transfer timing signal for setting a transfer distance to two and four lines, totally six lines, when the signal charges are transferred in the column direction after the field-shifted signals are supplied, and then supplying the timing signal;

a first row signal supply substep of generating a row transfer timing signal for setting a transfer distance to two columns when the transferred signal charges are transferred in the row direction after the first column signal supply substep, and supplying the timing signal;

a second column signal supply substep of generating a column transfer timing signal for setting a transfer distance to totally eight lines, comprising a couple of four lines, when the column signal supply substep is carried out again, and supplying the timing signal; and reading out all the line-shifted signal charges after the second column signal supply substep, said substep of generating the row transfer timing signal including the substeps of:

generating a row transfer timing signal for setting a transfer distance to two columns when the transferred signal charges are transferred in a row direction and supplies the timing signal, and in second one of said repeated substeps of the row transfer timing signal, all the line-shifted signal charges are read out.

* * * * *